US010968419B1

(12) United States Patent
Lanning

(10) Patent No.: US 10,968,419 B1
(45) Date of Patent: Apr. 6, 2021

(54) FERMENTATION BYPRODUCT MANAGEMENT

(71) Applicant: Douglas J. Lanning, Tustin, CA (US)

(72) Inventor: Douglas J. Lanning, Tustin, CA (US)

(\*) Notice: Subject to any disclaimer, the term of this patent is extended or adjusted under 35 U.S.C. 154(b) by 316 days.

(21) Appl. No.: 15/972,874

(22) Filed: May 7, 2018

Related U.S. Application Data

(60) Provisional application No. 62/502,736, filed on May 7, 2017.

(51) Int. Cl.
*C12C 13/10* (2006.01)

(52) U.S. Cl.
CPC .................... *C12C 13/10* (2013.01)

(58) Field of Classification Search
None
See application file for complete search history.

(56) References Cited

U.S. PATENT DOCUMENTS

| 4,708,938 | A | 11/1987 | Hickinbotham |
| 4,717,031 | A | 1/1988 | Hewson |
| 5,365,830 | A | 11/1994 | MacLennan et al. |
| 5,802,956 | A | 9/1998 | Robertson et al. |
| 6,561,078 | B1 | 5/2003 | Hughes |
| 8,015,915 | B2 | 9/2011 | Poissant |
| 8,172,926 | B2 | 5/2012 | Bender |
| 9,717,260 | B2 | 8/2017 | Diggs et al. |
| 2016/0083155 | A1 | 3/2016 | Anderson |

FOREIGN PATENT DOCUMENTS

CA      2501570 A1 * 9/2006 ........... C12G 1/0206

OTHER PUBLICATIONS

Noral Brewing Solutions, Installing a Canning Jar Gasket, and Oxygen-Free Conical Sampling using a Krausen Catcher, Feb. 16, 2017, Youtube Video, https://www.youtube.com/watch?v=GyzWuzU37K4 (Screenshot of Youtube webpage attached) (Year: 2017).*
"How to Capture Co2 and Carbonate Your Beverage" <https://www.angelfire.com/cantina/carbonation/CapturingCo2.htm> Archived from the original on Aug. 12, 2016 (Year: 2016).*

\* cited by examiner

*Primary Examiner* — Holly Kipouros
(74) *Attorney, Agent, or Firm* — The Webb Law Firm

(57) ABSTRACT

An apparatus for capturing blowoff and fermentation gasses from a fermenter for food or beverages includes a blowoff vessel configured to capture blowoff from the fermenter and positioned externally to the fermenter, the blowoff vessel including a first port configured to establish fluid communication between the blowoff vessel and the fermenter; an airlock in fluid communication between the blowoff vessel and ambient atmosphere; and a gas receptacle in fluid communication with the blowoff vessel, the gas receptacle configured to receive and store fermentation gases from the fermenter during fermentation, and to allow stored fermentation gases to return to the fermenter during suck-back.

11 Claims, 11 Drawing Sheets

FERMENTATION BYPRODUCT MANAGEMENT

CROSS-REFERENCE TO RELATED APPLICATION

This application claims priority to U.S. Provisional Patent Application No. 62/502,736, filed on May 7, 2017, the entire content of which is incorporated by reference as if fully restated herein.

BACKGROUND OF THE DISCLOSURE

Technical Considerations

The present disclosure relates generally to production of fermented beverages, and more specifically to managing fermentation byproducts, including fermentation blowoff and fermentation gases. Although this disclosure emphasizes the present invention's relevance to home brewing beer, its relevance to small-scale commercial production of beer, as well as to small-scale home or commercial production of other fermented beverages, such as wine, cider, and mead, will be apparent to those skilled in the art.

Description of the Related Art

The brewing of fermented beverages, including beer brewing, and particularly home brewing, provides widespread recreational enjoyment and delicious fermented beverages. Many brewers take as much pride in developing sound beverage-making processes as they do in producing the finest quality fermented beverage. However, fermentation blowoff and post-fermentation suck-back are troublesome aspects of the brewing process for many brewers, and there is a need for improved methods and equipment to address these problems.

The term "blowoff" may be used herein to refer to foamy liquid or combination of liquid and gas, often with suspended solids, that is discharged from a fermenter by gases generated during the fermentation process. Kraeusen may be included as part of the blowoff. "Blowoff" also may refer to herein an event in which the fermenter expels this foamy liquid or liquid-gas combination.

"Suck-back" means a phenomenon in which a fermenter draws or sucks liquids and/or gases into the fermenter when the fermenter, and the liquid and gases in the fermenter, cool, and the gases present in the fermenter contract. Cooling may occur due to the slowing or cessation of the fermentation process, or due to a decrease in ambient temperature in the environment surrounding the fermenter.

In the context of home brewing, a known fermenter configuration typically is sealed with a standard liquid-filled airlock positioned directly on the fermenter. Known airlocks include standard S-type airlocks, or a standard 3-piece airlock. These airlocks allow pressurized fermentation gases to escape from the fermenter by bubbling up through liquid within the airlock, while preventing ambient air from passing freely into the fermenter. Isolating the liquid in the fermenter from the ambient air during fermentation is important, because ambient air can contain microbes that may contaminate the fermented beverage and ruin the entire batch.

The fermentation process can cause blowoff, in which the foamy kraeusen that forms on the top of fermenting liquid is discharged from the fermenter by fermentation gases (such as carbon dioxide) that are generated within the vessel during the fermentation process. Blowoff can foul a standard airlock and may plug it as well. The blowoff likely contains fermentable sugars from the fermenting liquid, such as beer wort, and if the airlock becomes fouled with the blowoff, there is increased potential for undesirable microbes to grow in the airlock and gain a pathway to the fermenting liquid. If the airlock is plugged, pressure from fermentation gases can build within the fermenter until an eruption occurs. Such incidents may create a mess, and are potentially hazardous. Eruption may also breach additional seals in the fermenter, and may provide additional pathways for undesirable microbes to contaminate the fermenting liquid.

To avoid such issues associated with known airlocks, many brewers may use a blowoff tube routed from the fermenter to a blowoff bucket. The blowoff bucket typically is an open-topped container that is partially filled with water or other liquid. The outlet end of the blowoff tube is submerged in the liquid. The submerged tube provides a makeshift airlock, and the bucket contains the blowoff that is expelled from the fermenter through the blowoff tube.

However, the use of a blowoff bucket includes drawbacks of its own. For example, as fermentation continues after a blowoff event, the blowoff tube and blowoff bucket should be cleaned and replaced with a sanitized tube and airlock. This is because the liquid in the blowoff bucket will be fouled with blowoff containing fermentable sugars. The blowoff in the blowoff bucket is exposed to microbes in the ambient air, which may breed in the blowoff bucket, and residual blowoff in the blowoff tube provides a pathway for microbial growth to gain access to and contaminate the fermenting liquid. Cleaning and sanitizing may be a problem for brewers who need to be away from their fermenter during fermentation, such as home brewers who travel for work. Further, the blowoff tube and blowoff bucket may need to be cleaned more than once during a fermentation, as blowoff may occur over an extended period of time, such as for several days. During cleaning, the fermenter may continue to blow off, making the task challenging and messy, and increasing exposure of the fermenting liquid to undesirable microbes.

After the most active period of fermentation has passed, a brewer may continue to use a blowoff bucket until the fermenting liquid is ready to be transferred out of the fermenter, or the brewer may replace the blowoff bucket with a standard airlock. A disadvantage of continuing with a blowoff bucket is that the liquid in the bucket may be stagnant for weeks, becoming unsanitary and attracting vectors for contamination, such as fruit flies. Changing to a standard airlock may address the problem of fouled water in the blowoff bucket, but this is yet another task for the brewer, and increases the risk of introducing unwanted microbes and/or oxygen into the fermenter—either of which may adversely affect the flavor of the finished fermented beverage.

Moreover, regardless of whether the brewer continues with a blowoff bucket or changes to a standard airlock in known systems, the fermenting liquid may be subject to suck-back problems when the fermenting liquid cools. Suck-back occurs when the fermenter headspace gases contract due to cooling. It is common for the fermenter to cool after fermentation, because fermentation itself raises the temperature of the fermenting liquid. Also, the fermenting liquid may cool due to ambient temperature changes. More significant cooling may be caused by the brewer performing a cold crash, which includes decreasing the temperature of the fermenting liquid to cause the yeast in the fermenting liquid to go dormant and settle out, thereby clearing the fermenting liquid.

When the headspace gases in the fermenter cool and contract, the gas pressure within the fermenter decreases. This decrease in gas pressure can become a vacuum that draws liquid or air into the fermenter to fill the void. This is suck-back. If a blowoff bucket is in use during cooling, liquid from the blowoff bucket may be drawn into the fermenter and mix with the fermenting liquid. This liquid can cause off-flavors, infect the beer with undesirable microbes, such as bacteria or wild yeasts, or make the beer unsafe to drink.

Further, even if a known standard airlock is in use during cooling, liquid from the known airlock liquid may be drawn into the fermenter, along with a significant amount of air from ambient atmosphere. This liquid and/or air may include undesirable microbes and may contaminate the fermenting liquid. Also, the introduction of air into finished fermented beverage such as beer may lead to oxidation and the formation of staling compounds that result in defects in flavor. For example, beer recipes that use a large quantity of flavor and aroma hops, such as IPAs, may be particularly susceptible to oxidation off-flavors and loss of flavor due to exposure to oxygen and/or microbes in air. Highly hopped beers are popular, so an objective of many craft brewers is to limit their beer's exposure to oxygen in pursuit of producing the highest quality beer.

SUMMARY OF THE DISCLOSURE

In view of the foregoing, there is a need to efficiently and cost-effectively improve methods and equipment to address the issues associated with fermentation blowoff and post-fermentation suck-back.

Generally, provided is a system and apparatus for receiving and containing fermentation blowoff, for receiving and storing fermentation gases, and for allowing the fermentation gases to be returned to the fermenter during suck-back.

Therefore, in one non-limiting example, provided is a system and apparatus that can be sanitized prior to use. The apparatus includes a substantially sealed blowoff vessel, an airlock, and an inflatable gas receptacle to store fermentation gases. The airlock is disposed in association and in fluid communication with the blowoff vessel to form an air-locked blowoff vessel. This arrangement may eliminate the need for an airlock at the fermenter that could become fouled during blowoff. The blowoff vessel, when sanitized, provides containment of blowoff in a sanitized environment to reduce or eliminate exposure to undesirable microbes. The gas receptacle is disposed in fluid communication with the blowoff vessel. During fermentation, the blowoff is received and contained within the sealed blowoff vessel, and the fermentation gases flow into the gas receptacle for storage. Excess gases are released to the ambient atmosphere via the airlock. After fermentation, when the fermenter is cooled, the gas receptacle allows stored fermentation gases to return to the fermenter in response to fermenter suck-back. This use of stored fermentation gases reduces or eliminates suck-back of liquid or air that could affect the quality of the fermented beverage.

In another example consistent with the present disclosure, provided is a substantially sealed blowoff vessel and an airlock disposed in association with the blowoff vessel. The air-locked blowoff vessel is configured to contain the blowoff while allowing excess gases to be released to the ambient atmosphere through the airlock. Generally, the blowoff vessel stores gases as well as providing blowoff containment. Various examples may or may not include an airlock that is configured to allow ambient air into the blowoff vessel upon fermenter vacuum. For variations that allow ambient air into the blowoff vessel under vacuum conditions, the apparatus may supply a mixture of stored gases and air to the fermenter in response to suck-back. One or more baffles may be included within the blowoff vessel to preferentially return a mixture with more stored gases rather than air.

In a further example according to the present disclosure, provided is an apparatus for capturing blowoff and fermentation gasses from a fermenter for food or beverages. The apparatus includes a blowoff vessel configured to capture blowoff from the fermenter and positioned externally to the fermenter. The blowoff vessel includes a first port configured to establish fluid communication between the blowoff vessel and the fermenter; an airlock in fluid communication between the blowoff vessel and ambient atmosphere; and a gas receptacle in fluid communication with the blowoff vessel, the gas receptacle configured to receive and store fermentation gases from the fermenter during fermentation, and to allow stored fermentation gases to return to the fermenter during suck-back.

In yet another example consistent with the present disclosure, provided is an apparatus for capturing blowoff and fermentation gas from a fermenter of food or beverages. The apparatus includes a containment vessel including an exterior surface and an interior; a channel in fluid communication with the interior of the containment vessel, the channel at least partially defined by a first portion of the exterior surface of the containment vessel; a first port configured to establish fluid communication between the fermenter and the interior of the containment vessel; and a skirt extending into the channel, wherein the channel and the skirt coact to form an airlock in fluid communication between the interior of the containment vessel and ambient atmosphere when at least a portion of the skirt is covered by liquid in the channel.

In yet another example consistent with the present disclosure, provided is an apparatus for capturing blowoff and fermentation gases from a fermenter of food or beverages. The apparatus includes a containment vessel including an exterior surface and an interior, a channel in fluid communication with the interior of the containment vessel, the channel at least partially circumscribing a first portion of the exterior surface of the containment vessel; a first port configured to establish fluid communication between the fermenter and the interior of the containment vessel; and a skirt extending into the channel, wherein the channel and the skirt coact to form an airlock in fluid communication between the interior of the containment vessel and ambient atmosphere when at least a portion of the skirt is covered by liquid in the channel.

Non-limiting examples consistent with the present disclosure further may be characterized by one or more of the following clauses:

Clause 1: An apparatus for capturing blowoff and fermentation gasses from a fermenter for food or beverages comprises a blowoff vessel configured to capture blowoff from the fermenter and positioned externally to the fermenter, the blowoff vessel comprising a first port configured to establish fluid communication between the blowoff vessel and the fermenter; an airlock in fluid communication between the blowoff vessel and ambient atmosphere; and a gas receptacle in fluid communication with the blowoff vessel, the gas receptacle configured to receive and store fermentation gases from the fermenter during fermentation, and to allow stored fermentation gases to return to the fermenter during suck-back.

Clause 2: The apparatus according to clause 1, wherein the gas receptacle is inflatable.

Clause 3: The apparatus according to any of clauses 1 and 2, wherein the airlock is liquid-filled.

Clause 4: The apparatus according to any of clauses 1 to 3, further comprising an access cover removably covering at least a portion of the blowoff vessel.

Clause 5: The apparatus according to any of clauses 1 to 4, further comprising: a second port establishing fluid communication between the blowoff vessel and the gas receptacle; and a gas tube in fluid communication with the blowoff vessel and the gas receptacle.

Clause 6: The apparatus according to any of clauses 1 to 4, further comprising: a second port; and a gas tube comprising: a first end positioned proximally to the blowoff vessel, and a second end positioned distally from the blowoff vessel; and wherein the gas receptacle comprises a receptacle port configured to sealably mate with the second port, wherein at least a first portion of the first end of the gas tube extends coaxially into the second port, and the second end extends into the gas receptacle, and wherein fluid communication is established between the blowoff vessel and the gas receptacle through at least one of the second port and the gas tube.

Clause 7: The apparatus according to any of clauses 1 to 7, wherein the blowoff vessel further comprises a containment vessel, the containment vessel comprising an exterior surface and an interior; and wherein the airlock comprises: a channel in fluid communication with the interior of the containment vessel, the channel at least partially defined by a first portion of the exterior surface of the containment vessel, and a skirt extending into the channel, wherein the channel and the skirt coact to form the airlock when at least a portion of the skirt is covered by liquid in the channel.

Clause 8: The apparatus according to clause 7, further comprising: an airlock vessel comprising an outer surface and an inner surface, the airlock vessel configured to receive the containment vessel, wherein the channel is at least partially defined by a first portion of the inner surface of the airlock vessel.

Clause 9: The apparatus according to clauses 7 and 8, further comprising an access cover removably covering at least a portion of the containment vessel and the channel, wherein the skirt is formed on the access cover, and extends from the access cover into the channel.

Clause 10: The apparatus according to any of clauses 1 and 2, wherein the blowoff vessel further comprises: a containment vessel comprising an exterior surface and an interior; and an airlock vessel comprising an outer surface and an inner surface, the airlock vessel configured to receive the containment vessel an access cover removably covering at least a portion of the blowoff vessel, the access cover comprising: a second port establishing fluid communication between the blowoff vessel and the gas receptacle, and a skirt extending into the airlock, wherein the first port is positioned on the access cover; a gas tube in fluid communication with the blowoff vessel and the gas receptacle; the gas tube comprising: a first end positioned proximally to the blowoff vessel, and a second end positioned distally from the blowoff vessel; wherein the gas receptacle comprises a receptacle port configured to sealably mate with the second port to establish fluid communication between the blowoff vessel and the gas receptacle, wherein at least a first portion of the first end of the gas tube extends coaxially into the second port, and the second end extends into the gas receptacle, and wherein fluid communication is established between the blowoff vessel and the gas receptacle through at least one of the second port and the gas tube wherein the airlock comprises: a channel in fluid communication with the interior of the containment vessel, the channel at least partially defined by a first portion of the exterior surface of the containment vessel and a first portion of the inner surface of the airlock vessel; and wherein the channel and the skirt coact to form the airlock when at least a portion of the skirt is covered by liquid in the channel.

Clause 11: The apparatus according to any of clauses 1 to 10 further comprising a blowoff fitting, the blowoff fitting comprising a first aperture, a second aperture, and a third aperture, wherein the blowoff fitting establishes fluid communication between the fermenter and the first port through the first aperture and the second aperture, and wherein the blowoff fitting establishes fluid communication between the fermenter and the gas receptacle through the first aperture and the third aperture.

Clause 12: The apparatus according to any of clauses 1 to 11, further comprising a baffle configured to increase fluid flow path distance for at least a portion of the flow between the first port and the airlock.

Clause 13: An apparatus for capturing blowoff and fermentation gas from a fermenter of food or beverages, comprising: a containment vessel comprising an exterior surface and an interior; a channel in fluid communication with the interior of the containment vessel, the channel at least partially defined by a first portion of the exterior surface of the containment vessel; a first port configured to establish fluid communication between the fermenter and the interior of the containment vessel; and a skirt extending into the channel, wherein the channel and the skirt coact to form an airlock in fluid communication between the interior of the containment vessel and ambient atmosphere when at least a portion of the skirt is covered by liquid in the channel.

Clause 14: The apparatus according to clause 13, further comprising an access cover removably covering at least a portion of the channel and at least a portion of the containment vessel, wherein the skirt is formed on the access cover, and extends from the access cover into the channel.

Clause 15: The apparatus according to clauses 13 and 14, further comprising: an airlock vessel comprising an outer surface and an inner surface, the airlock vessel configured to receive the containment vessel, wherein the channel is at least partially defined by a first portion of the inner surface of the airlock vessel.

Clause 16: the apparatus according to any of clauses 13 to 15, wherein the interior of the containment vessel further comprises a baffle, configured to increase fluid flow path distance for at least a portion of the flow between the first port and the airlock.

Clause 17: the apparatus according to any of clauses 13 to 16, further comprising: a gas receptacle in fluid communication with the interior of the containment vessel, the gas receptacle configured to receive and store fermentation gases from the fermenter during fermentation, and to allow stored fermentation gases to return to the fermenter during suck-back.

Clause 18: the apparatus according to clause 17, further comprising: a second port; and a gas tube comprising: a first end positioned proximally to the containment vessel, and a second end positioned distally from the containment vessel; and wherein the gas receptacle comprises a receptacle port configured to sealably mate with the second port to establish fluid communication between the interior of containment vessel and the gas receptacle, wherein at least a first portion of the first end of the gas tube extends coaxially through the second port, and the second end extend into the gas receptacle, and wherein fluid communication is established between the interior of the containment vessel and the gas receptacle through at least one of the second port and the gas tube.

Clause 19: An apparatus for capturing blowoff and fermentation gases from a fermenter of food or beverages, comprising: a containment vessel comprising an exterior surface and an interior, a channel in fluid communication with the interior of the containment vessel, the channel at least partially circumscribing a first portion of the exterior surface of the containment vessel; a first port configured to establish fluid communication between the fermenter and the interior of the containment vessel; and a skirt extending into the channel, wherein the channel and the skirt coact to form an airlock in fluid communication between the interior of the containment vessel and ambient atmosphere when at least a portion of the skirt is covered by liquid in the channel.

Clause 20: The apparatus according to clause 19, further comprising: an airlock vessel comprising an outer surface and an inner surface, the airlock vessel configured to receive the containment vessel and the channel; an access cover removably covering at least a portion of the channel and at least a portion of the containment vessel, wherein the skirt is formed on the access cover, and extends from the access cover into the channel, and wherein the first port is positioned on the access cover; and an inflatable gas receptacle in fluid communication with the interior of the containment vessel, the gas receptacle configured to receive and store fermentation gases from the fermenter during fermentation, and to allow stored fermentation gases to return to the fermenter during suck-back.

Clause 21: An apparatus for capturing and storing fermentation gasses from a fermenter, comprising: a containment vessel; an access cover removably covering at least a portion of the containment vessel, the access cover comprising a first port configured to establish fluid communication between the containment vessel and the fermenter; an airlock in fluid communication between the containment vessel and ambient atmosphere; and a gas receptacle in fluid communication with the containment vessel, the gas receptacle configured to receive and store fermentation gases from the fermenter at a first gas pressure range, and to allow stored fermentation gases to return to the fermenter at a second gas pressure range, wherein the first gas pressure range at least partially exceeds the second gas pressure range.

Clause 22: The apparatus according to clause 21, wherein the access cover comprises a second port in fluid communication with the containment vessel, and wherein the gas receptacle is in fluid communication with the second port.

Clause 23: The apparatus according to clauses 20 and 21, wherein the gas receptacle is inflatable.

Clause 24: The apparatus according to any of clauses 21 to 23, further comprising a gas tube establishing fluid communication between the containment vessel and the gas receptacle.

Clause 25: The apparatus according to clause 24, wherein the gas tube is rigid.

Clause 26: The apparatus according to clause 24, wherein the gas tube is flexible.

Clause 27: The apparatus according to any of clauses 21 to 26, wherein the gas tube extends into the gas receptacle.

Clause 28: The apparatus according to any of clauses 21 to 26, wherein the gas tube comprises: a first end positioned proximally to the containment vessel, a second end positioned distally from the containment vessel, and a gas tube orifice positioned on the second end of the gas tube; and wherein the gas receptacle comprises a port configured to sealably mate with the gas tube orifice to establish fluid communication between the containment vessel and the gas receptacle.

Clause 29: The apparatus according to any of clauses 21 to 28, wherein the containment vessel comprises an exterior surface and an interior; and wherein the airlock comprises: a channel in fluid communication with the interior of the containment vessel, the channel at least partially defined by a first portion of the exterior surface of the containment vessel, and a skirt extending into the channel, wherein the channel and the skirt coact to form the airlock when at least a portion of the skirt is covered by liquid in the channel.

Clause 30: The apparatus according to clause 29, further comprising: an airlock vessel comprising an outer surface and an inner surface, the airlock vessel configured to receive the containment vessel, wherein the channel is at least partially defined by a first portion of the inner surface of the airlock vessel.

Clause 31: The apparatus according to clauses 29 and 30, wherein the skirt is formed on the access cover, and extends from the access cover into the channel.

Clause 32: The apparatus according to any of clauses 21 to 31, wherein the containment vessel is configured to capture blowoff from the fermenter.

Clause 33: An apparatus for capturing from a fermenter blowoff produced during fermentation, comprising: a containment vessel comprising an exterior surface and an interior; a channel in fluid communication with the interior of the containment vessel, the channel at least partially defined by a first portion of the exterior surface of the containment vessel; an access cover removably covering at least a portion of the channel and at least a portion of the containment vessel, the access cover comprising a first port configured to establish fluid communication between the fermenter and the interior of the containment vessel; and a skirt extending into the channel, wherein the channel and the skirt coact to form an airlock in fluid communication between the interior of the containment vessel and ambient atmosphere when at least a portion of the skirt is covered by liquid in the channel.

Clause 34: The apparatus according to clause 33, further comprising: an airlock vessel comprising an outer surface and an inner surface, the airlock vessel configured to receive the containment vessel, wherein the channel is at least partially defined by a first portion of the inner surface of the airlock vessel.

Clause 35: The apparatus according to clauses 33 and 34, wherein the skirt is formed on the access cover, and extends from the access cover into the channel.

Clause 36: The apparatus according to any of clauses 33 to 35, wherein the interior of the containment vessel further comprises a baffle, wherein the baffle separates the containment vessel into a first chamber and a second chamber, wherein the baffle is configured to impede flow of blowoff from the first chamber to the second chamber, and wherein the baffle is configured to allow flow of fermentation gases from the first chamber to the second chamber through at least one opening in the baffle, the at least one opening positioned proximally to the access cover.

Clause 37: The apparatus according to any of clauses 33 to 36, further comprising: an inflatable gas receptacle in fluid communication with the interior of the containment vessel, the gas receptacle configured to receive and store fermentation gases from the fermenter at a first gas pressure range, and to allow stored fermentation gases to return to the fermenter at a second gas pressure range, wherein the first gas pressure range at least partially exceeds the second gas pressure range.

Clause 38: the apparatus according to clause 37, further comprising: a gas tube establishing fluid communication between the interior of the containment vessel and the gas receptacle, the gas tube comprising: a first end positioned proximally to the containment vessel, a second end positioned distally from the containment vessel, and a gas tube orifice positioned on the second end of the gas tube; and wherein the gas receptacle comprises a port configured to sealably mate with the gas tube orifice.

Clause 39: A system for managing byproducts of fermentation from a fermenter, comprising: a containment vessel comprising an exterior surface and an interior; an airlock vessel comprising: a bottom, and a sidewall extending upwardly from the bottom of the airlock vessel having an outer wall surface and an inner wall surface, wherein the airlock vessel is receives the containment vessel to form a channel between a first portion of the inner wall surface of the airlock vessel and a first portion of the exterior surface of the containment vessel; a skirt extending into the channel, the skirt comprising an outward surface and an inward surface, wherein an outer channel is defined between the inner wall surface of the airlock vessel and the outward surface of the skirt, wherein an inner channel is defined between the inward surface of the skirt and the exterior surface of the containment vessel, wherein the outer channel is in fluid communication with the inner channel, and wherein the inner channel and the outer channel establish an airlock in fluid communication between the interior of the containment vessel and ambient atmosphere; an access cover removably covering at least a portion of the airlock vessel, the access cover comprising a first port and a second port, wherein the first port is configured to allow fluid communication between the fermenter and the interior of the containment vessel; and an inflatable gas receptacle in fluid communication with the interior of the containment vessel through the second port, the inflatable gas receptacle configured to receive and store fermentation gases from the fermenter at a first gas pressure range, and to allow stored fermentation gases to return to the fermenter at a second gas pressure range, wherein the first gas pressure range at least partially exceeds the second gas pressure range.

Clause 40: The system according to clause 39, further comprising: a gas tube establishing fluid communication between the interior of the containment vessel and the gas receptacle gas tube comprising: a first end positioned proximally to the containment vessel, a second end positioned distally from the containment vessel, and a gas tube orifice positioned on the second end of the gas tube; and wherein the gas receptacle comprises a port configured to sealably mate with the gas tube orifice.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE DISCLOSURE

Figure 1:
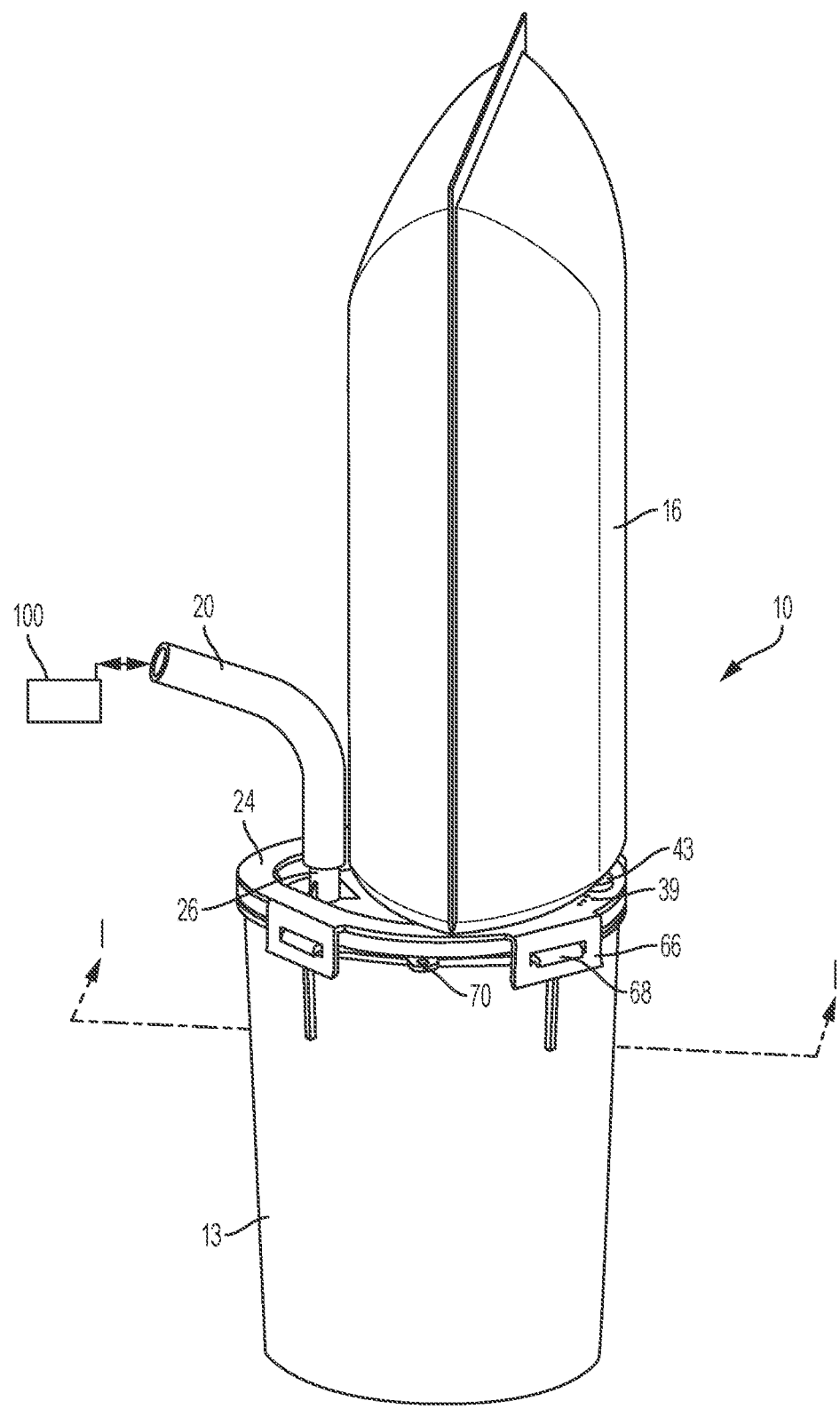
FIG. 1 is a perspective view of an exemplary apparatus for fermentation byproduct management.

It is to be understood that examples according to the present disclosure may assume various alternative variations and step sequences, except where expressly specified to the contrary. It is also to be understood that the specific devices and systems illustrated in the attached drawings, and described in the following specification, are simply examples of the disclosure.

Spatial or directional terms, such as "left", "right", "up", "down", "vertical", and the like, relate to the examples as they are shown in the drawing figures. However, examples of the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

All documents referred to herein are "incorporated by reference" in their entirety.

By "at least" is meant "greater than or equal to". By "not greater than" is meant "less than or equal to".

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The term "includes" is synonymous with "comprises".

When referring to different conditions, the terms "first", "second", etc., are not intended to refer to any particular order or chronology but instead refer to different conditions or properties. For illustration, apparatus described herein may include a first port and a second port, which differ in at least one physical property. For example, the first port and the second port may be separate ports disposed on the apparatus.

As used herein, the term "airlock" means a device or configuration that: (a) allows gases to flow from the interior of a vessel to the ambient atmosphere when the pressure within the vessel exceeds a first pressure value, the first pressure value being positive relative to the ambient atmosphere; and which (b) substantially prevents the passage of ambient air into the vessel via the airlock device or configuration when the pressure within the vessel exceeds a second pressure value, the second pressure value being negative relative to the ambient atmosphere. It is to be understood that airlocks may or may not allow gases to flow from the interior of the vessel to the ambient atmosphere when the pressure within the vessel does not exceed the first pressure value. It also is to be understood that airlocks may or may not substantially prevent the passage of ambient air into the vessel via the airlock device or configuration when the pressure within the vessel does not exceed the second pressure value. Further, airlocks may or may not rely on the flow of gases from the interior of the vessel to the ambient atmosphere to substantially prevent the passage of ambient air into the vessel via the airlock when the pressure within the vessel exceeds the first pressure value. Examples of airlocks according to this disclosure may include liquid-filled airlocks, check valves, one way valves, backflow prevention devices, backdraft dampers, vent valves, pressure-venting membrane slits, pressure relief valves, pressure relief dampers, microbe barrier filters, and airlock vessels.

As a non-limiting example, for a particular fermentation process and vessel, it may be preferable to establish a first pressure value of 1.5 inches water column relative to the ambient atmosphere and a second pressure value of −2.0 inches water column relative to the ambient atmosphere. In this case, a liquid-filled airlock may be selected that is designed to vent pressures greater than 1.5 inches water column and to provide vacuum relief for pressures less than −2.0 inches water column.

As used herein an "airlock vessel" means an outer vessel that forms at least a portion of an airlock for an inner vessel, wherein the inner vessel is received or positioned within the outer vessel.

As used herein, an "air-locked vessel" means a vessel that is substantially sealed (excluding ports) and having an airlock.

As used herein, "cold crash" means to decrease the temperature of the fermenting liquid in a fermenter to cause the yeast to go dormant and settle out, thereby clearing the beverage.

As used herein, a "fermenter" means a fermentation vessel for fermenting a food or beverage.

As used herein, the term "fluid" includes both a liquid and a gas.

As used herein, "fluid communication" means that a component may pass a fluid or fluids to another component either directly or indirectly. Fluid communication with a vessel, coupling, tube, receptacle, or bag means fluid communication with the interior of the vessel, coupling, tube, receptacle, or bag, respectively. Fluid communication with a port means a fluid can pass through the port.

As used herein, a "port" means a small opening in a vessel or surface allowing the controlled passage of fluids. A port may also receive a coupling in fluid communication with the port for connecting to a tube. A port also include a coupling that is integral with the vessel or surface.

As used herein, "vacuum" refers to a pressure that is less than the pressure of its surroundings, such as ambient atmosphere, thereby having a pressure that is negative relative to those surroundings. When pressure and vacuum of a point are measured at the same time relative to the ambient atmosphere, the vacuum value equals the negative of the pressure value.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

Figure 2:
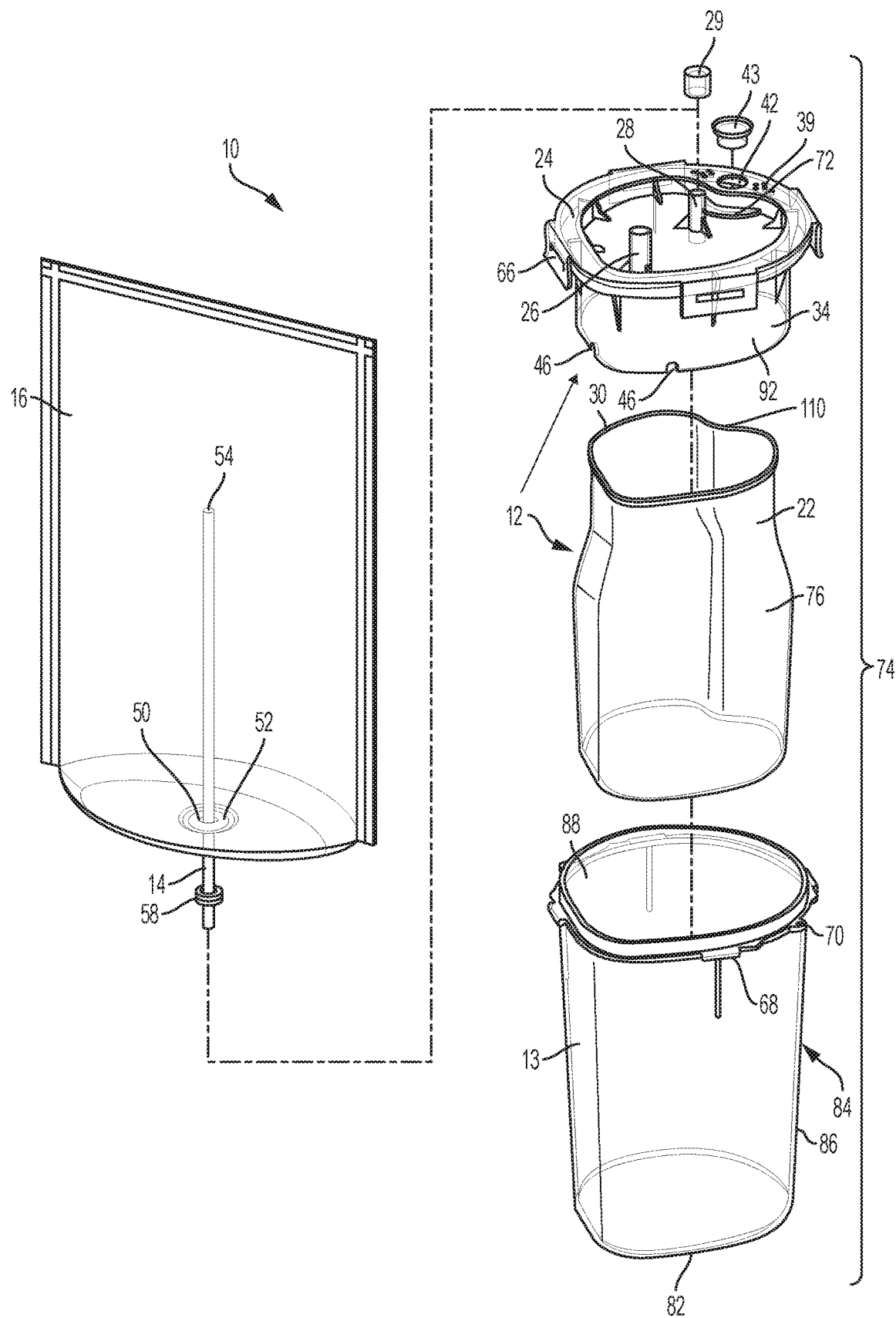
FIG. 2 is an exploded view of the apparatus of FIG. 1.
Figure 3:
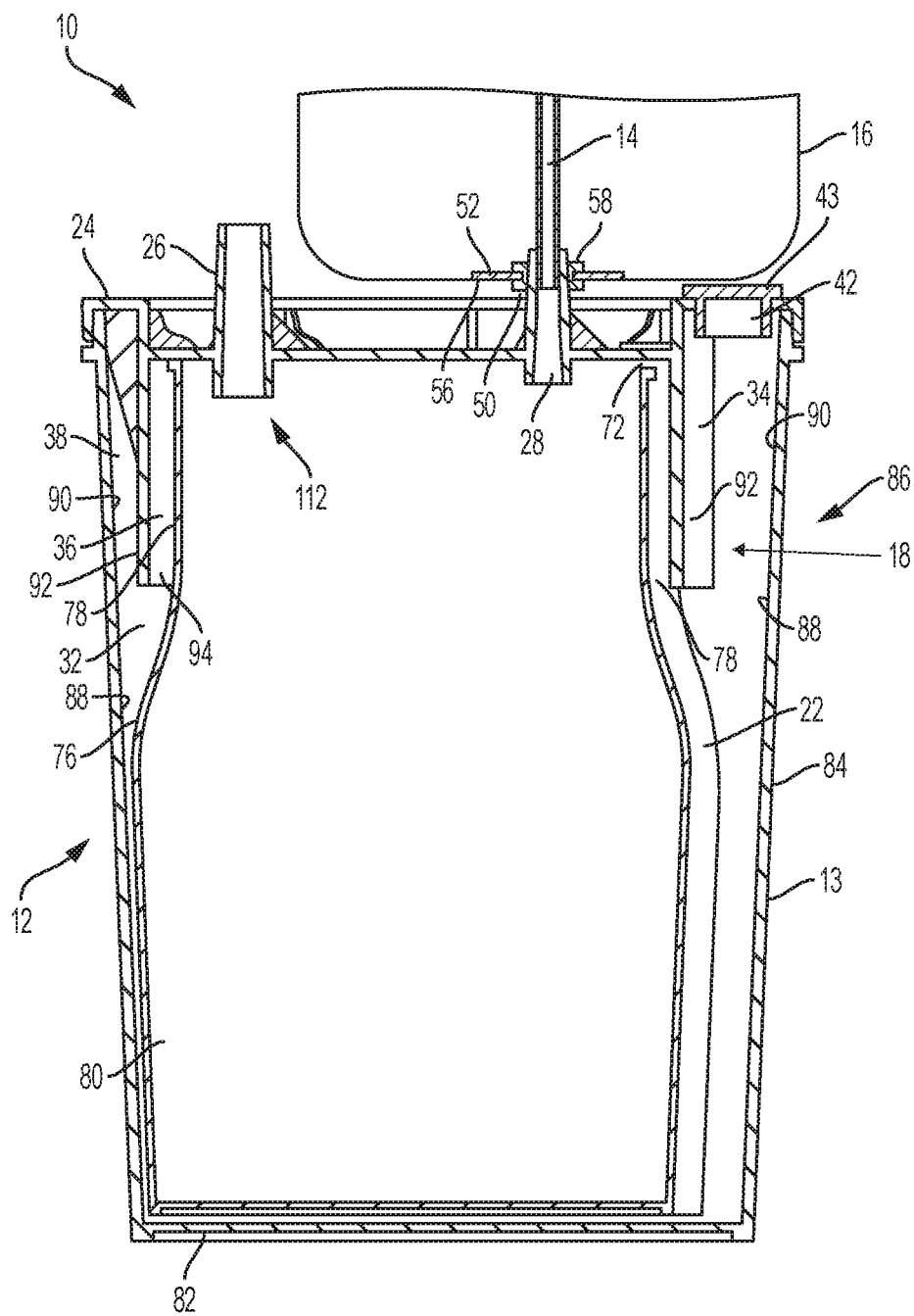
FIG. 3 is a front cross-sectional view of the apparatus of FIG. 1 taken along the vertical plane intersecting line I-I.

FIGS. 1-3 illustrate an exemplary blowoff-containment and gas-storage apparatus 10 consistent with the present disclosure. While apparatus 10 in FIG. 1 is opaque for clarity, it is to be understood that it may be preferable for any of the components of apparatus 10 to be transparent or translucent in order to allow a user to visually verify that the level of liquid in channel 32 is sufficiently high to allow the formation of an airlock, as shown in FIGS. 2-3. For example, it may be preferable for air lock vessel 13 to be transparent or translucent, so that a user may visually observe that the proper amount of airlock liquid is inputted into channel 32, or to visually observe the formation of gas bubbles in airlock 18. Other features of examples of apparatus 10, such as the containment vessel 22, access cover 24 and/or gas receptacle 16 also may be transparent, translucent, or opaque.

It is to be understood that examples of apparatus 10 may be constructed of materials that are compatible with the alcohol in fermented beverages and the acids of food-grade sanitizer solutions and fermented beverages. It may be preferable that the materials of apparatus 10 do not contribute any significant odor to the gases stored within the apparatus to avoid negative impacts to the fermented beverage. The material of the apparatus 10 may be shatter-resistant for safety, and to withstand use and cleaning. Plastic materials, such as food-grade plastics, may be preferable, but it is to be understood that all suitable alternatives including stainless steel or other metals, glass, ceramics, and other non-plastic materials, are consistent with this disclosure unless stated otherwise. Additional examples of suitable materials also are described herein.

Further, it also is to be understood that apparatus 10 may be sized and configured to provide reasonable overall space requirements and structural stability when installed near a fermenter 100 on a generally flat and horizontal surface. However, it is to be understood that other installations and configurations are consistent with this disclosure. For example, apparatus 10 may be configured to be mounted on the top of a fermenter to conserve floor/shelf space. In such a case, alternate examples may be configured for installation on carboys, buckets, conical fermenters, or other types of fermenters. It also is contemplated that blowoff port 26 may be located at the bottom of blowoff vessel 12, instead of the top, as shown in FIG. 2. In such a configuration, not shown, tubes internal to the apparatus may establish fluid communication with the containment vessel 22.

In another non-limiting example, apparatus 10 may include a support stand or legs, not shown, to elevate it. Individual elements of apparatus 10 may be rearranged accordingly. For example, if blowoff vessel 12 and airlock 18 (along with airlock vessel 13) are elevated on a stand, gas receptacle 16 may be disposed under blowoff vessel 12 and airlock 18. Gas port 28 may be located at the bottom of blowoff vessel 12 instead of the top.

With reference to FIGS. 1-3, apparatus 10 includes an air-locked blowoff vessel 12, and gas receptacle 16. It is to be understood that a cross-sectional view of gas receptacle 16 is shown in FIG. 3. However, for clarity in the figure, no cross-hatching is shown on gas receptacle 16. During operation, apparatus 10 is in fluid communication with a fermenter 100 via blowoff tube 20 and blowoff port 26, as schematically represented in FIG. 1. With reference to FIGS. 1 and 2, apparatus 10 receives fluid, such as blowoff and fermentation gases, from the fermenter 100 during fermentation of a beverage or food. Blowoff liquid may be substantially contained within blowoff vessel 12, while fermentation gases may flow through the blowoff vessel 12 and into gas receptacle 16. As shown, gas receptacle 16 may be inflatable, and may inflate to provide storage of fermentation gases. Volumes of fermentation gasses in excess of the volume available in the apparatus 12, including the gas receptacle 16, may be released into the ambient atmosphere via an airlock 18, as shown in FIG. 3, and as discussed more thoroughly below. After fermentation, when liquid in the fermenter 100 cools, fermenter suck-back draws fermentation gas from the gas receptacle 16, causing the gas receptacle to at least partially deflate. Stored gases within gas receptacle 16 flow through blowoff vessel 12, through the blowoff port 26 and blowoff tube 20, and back to the fermenter 100.

With continued reference to FIGS. 1-3, apparatus 10 further includes an access cover 24 configured to be positioned over the top of the containment vessel 22. The access cover 24 includes blowoff port 26, which establishes fluid communication between apparatus 10 and fermenter 100, as schematically shown in FIG. 1. Fluid may be communicated from the fermenter to the blowoff port 26 via a tube, such as blowoff tube 20, which is sealably connected to the fermenter 100 and the blowoff port 26. In examples, the tube may be connected directly to the blowoff port 26. As used herein, examples of tubes, such as blowoff tube 20, may include any hollow member to convey fluids, such as hoses, tubing, pipes, and ducts. Tubes may be rigid, semi-rigid, or flexible.

Figure 9:
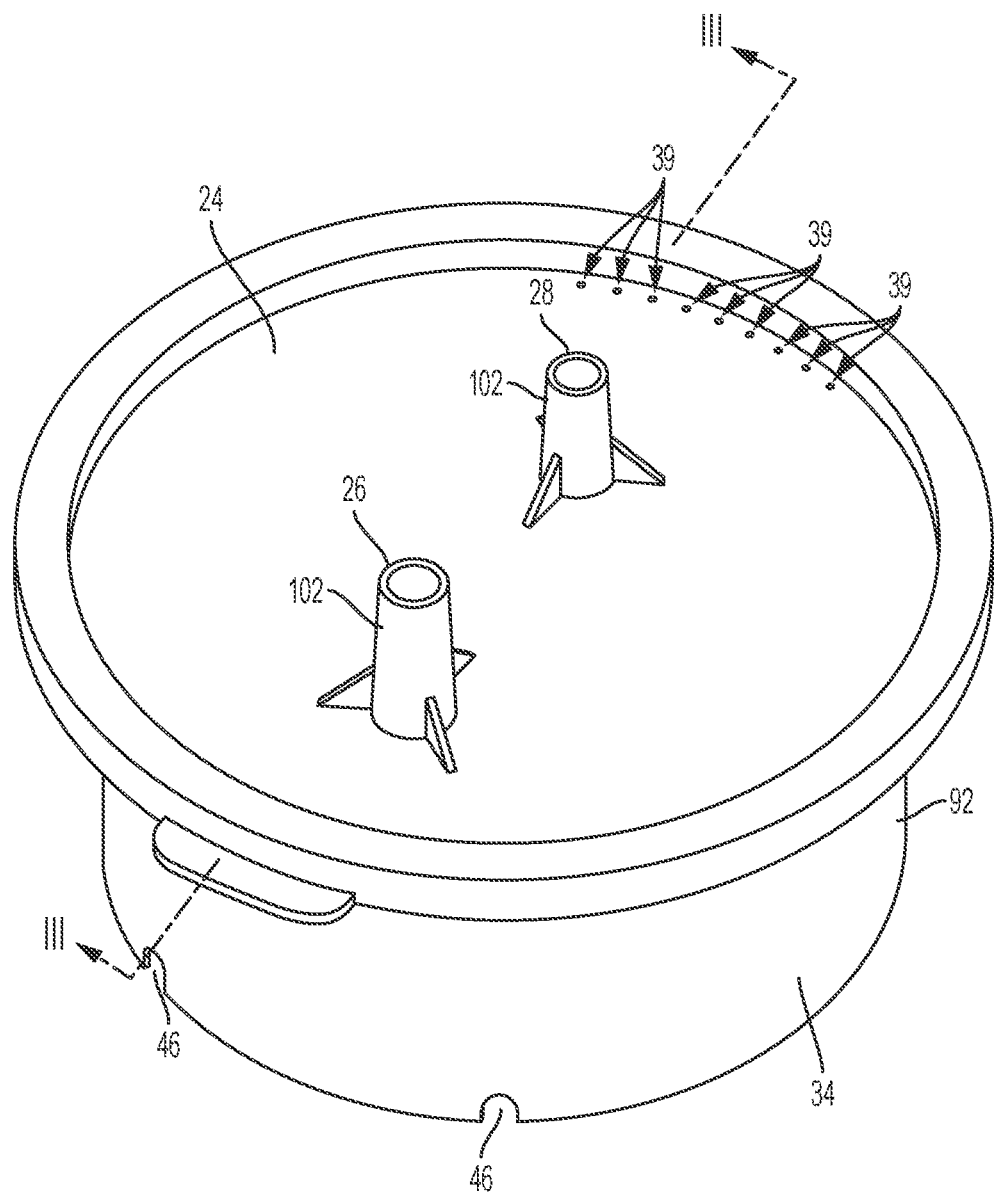
FIG. 9 is a top perspective view of another exemplary access cover according to the present disclosure.

In examples, a second tube tube fluidly connecting the fermenter 100 to the blowoff port 26 may be sealably connected to a blowoff tube 20, as in FIG. 1. As shown in FIG. 9, blowoff port 26 may include coupling connection protrusion 102 on the outside of access cover 24 that provides a substantially gas-tight seal when connected to blowoff tube 20. Examples of the couplings may include a tapered barbless connection. Alternate examples may include a hose barb, socket coupling, threaded coupling, cam and groove coupling, or other type of coupling.

Figure 6:
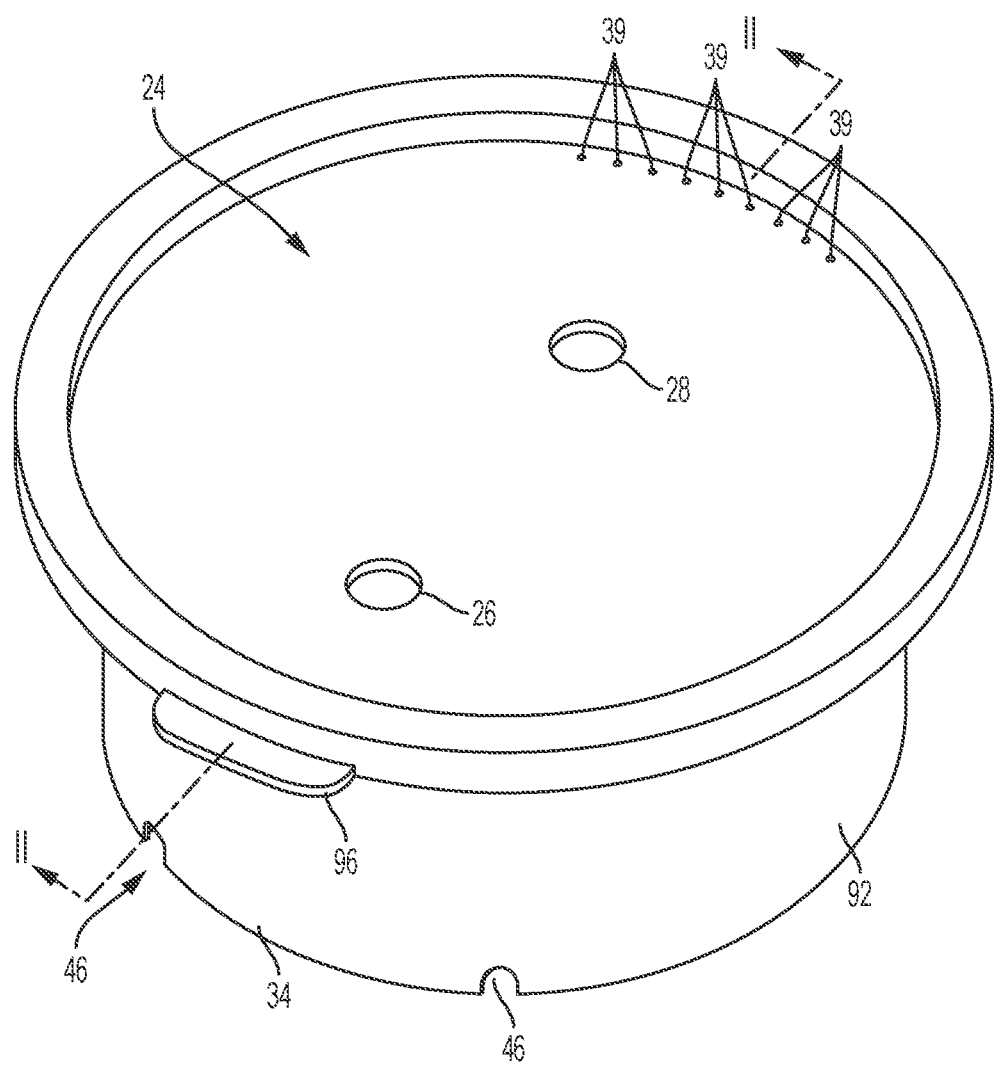
FIG. 6 is a top perspective view of an exemplary access cover according to the present disclosure.
Figure 7:
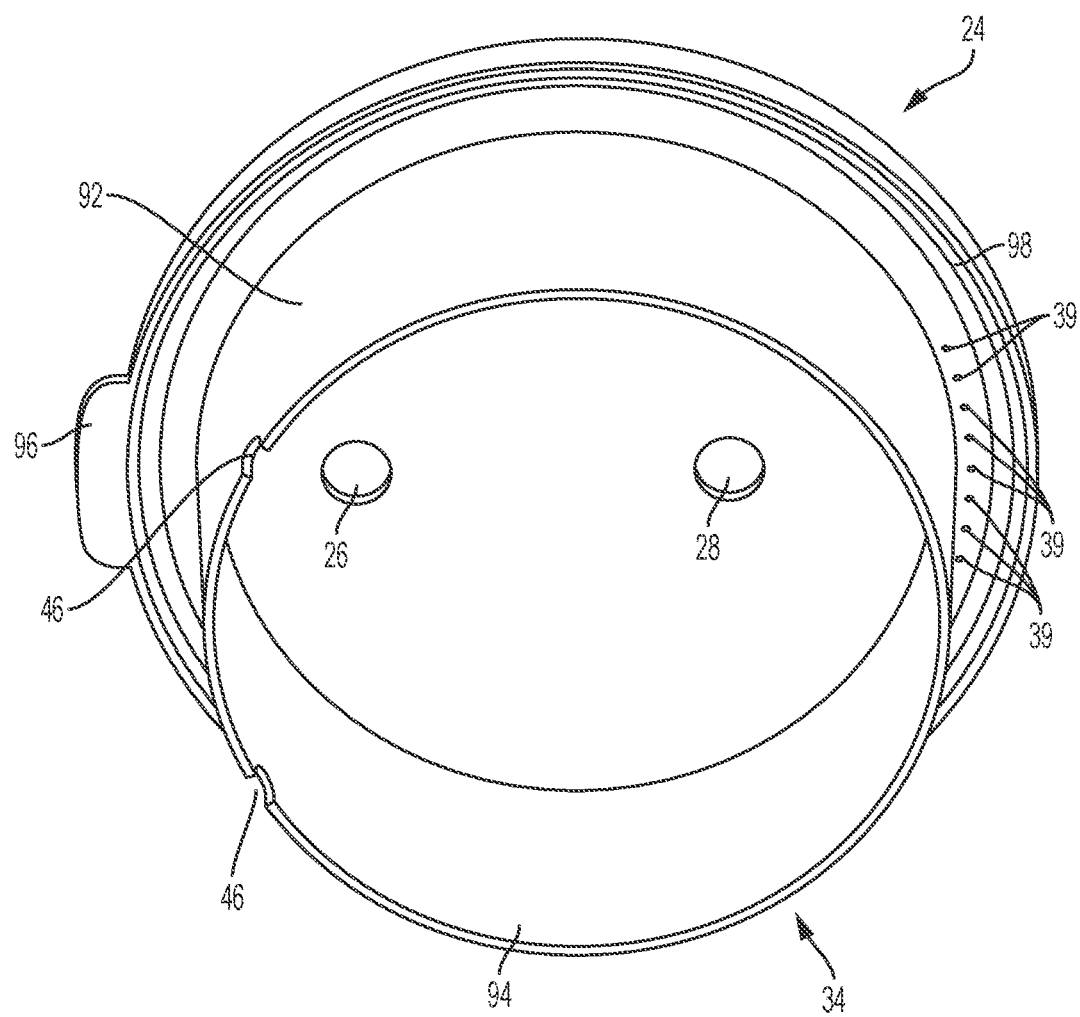
FIG. 7 is a bottom perspective view of the exemplary access cover according to FIG. 6.
Figure 8:
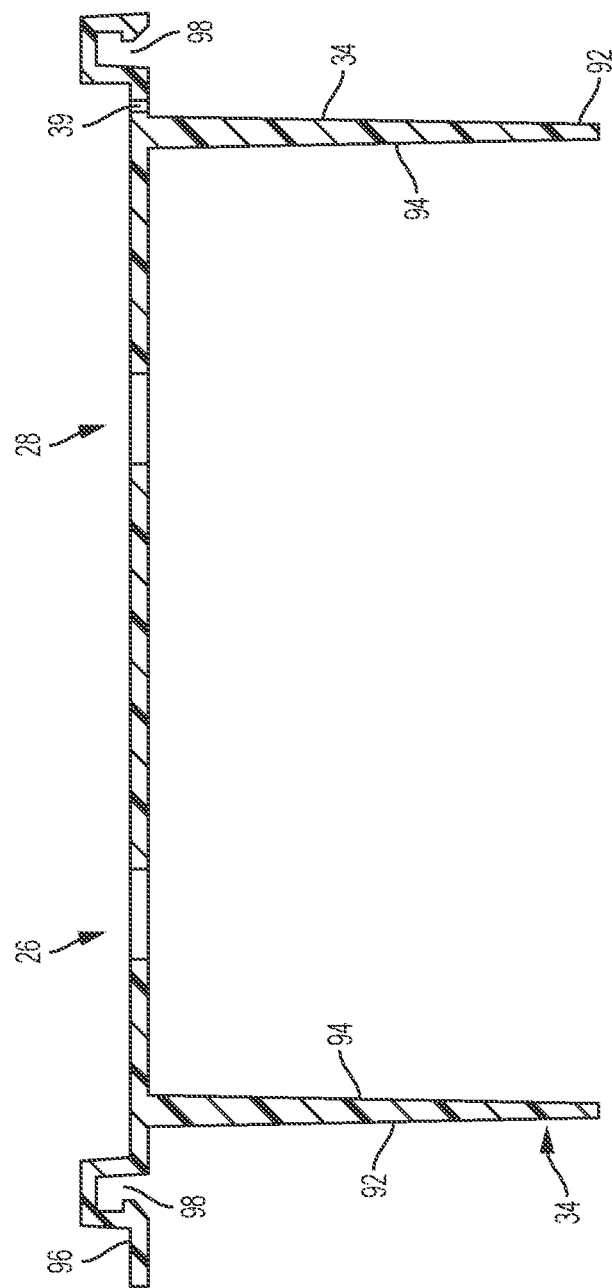
FIG. 8 is a cross-sectional view of the exemplary access cover of FIG. 6 taken along the vertical plane intersecting line II-II.

A further alternative example may include a blowoff port 26 that is an aperture only, without any coupling, as shown in FIGS. 6-8. In such an example, a substantially gas-tight seal at blowoff port 26 may be accomplished using a rigid tube inserted through an elastomeric grommet (not shown) installed at blowoff port 26. Blowoff tube 20 may sealably connect to blowoff port 26 via a separate coupling that is connected to blowoff port 26 with a gas tight seal. The tube may include a hose barb on the outside of blowoff vessel 12 that provides a substantially gas-tight seal when connected to blowoff tube 20. If blowoff port 26 is an aperture only, another alternative may include a bulkhead fitting with a hose barb end. All other suitable connections that are used in the art are also contemplated.

With reference to FIG. 1, examples of blowoff tube 20 may be comprised of vinyl or silicone tubing. The diameter of blowoff tube 20 may be determined based on the anticipated flow of blowoff and gas from the fermenter, as well as maintaining a minimum inside diameter to reduce the possibility of plugging. In examples, the tube connecting the fermenter 100 to the blowoff tube 20 may be a flexible tube, and the blow off tube 20 may be substantially rigid to support the weight of the length of the tube connecting the fermenter 100 with the blowoff port 26 without bending or collapsing. Blowoff port 26 is positioned on apparatus 10 to allow convenient connection of blowoff tube 20 without introducing intermediate low points in the tubing that would fill with blowoff liquid and create a gas trap.

Blowoff tube 20 may aid in directing flow of the blowoff into a desired space within the apparatus. For example, an exemplary blowoff tube 20 may include a downward angle, as shown in FIG. 1, which is configured to direct the flow of blowoff from the fermenter 100 into and toward the bottom of the containment vessel 22 within the apparatus 10. Blowoff port 26 may be configured such that blowoff enters containment vessel 22 with the flow directed approximately straight down. This flow direction may vary for alternative examples, but preferably the flow direction is at least 90 degrees away from straight up, as this provides opportunity for gravity separation of the blowoff liquid from fermentation gases before the blowoff reaches the top of or fills blowoff vessel 12.

Figure 10:
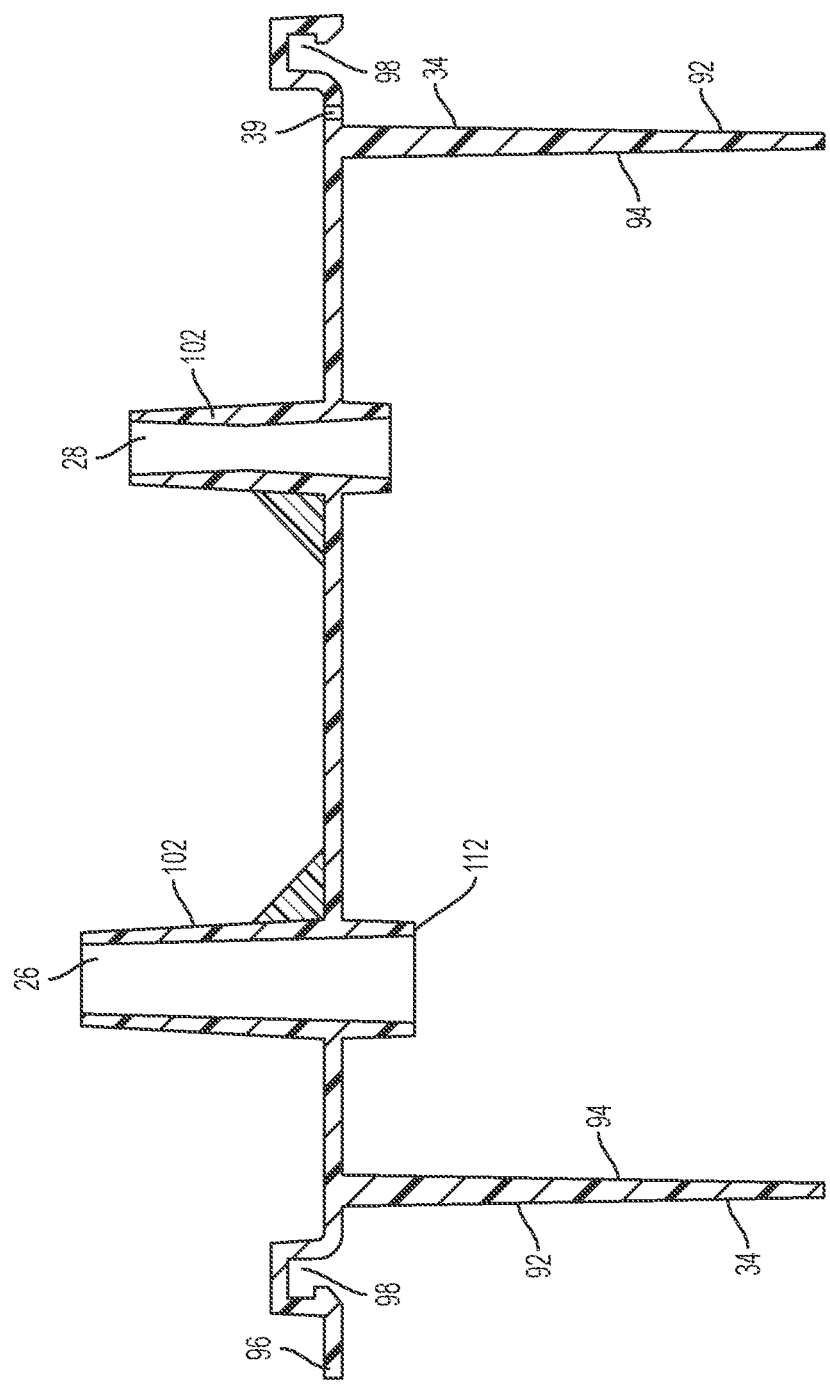
FIG. 10 is a cross-sectional view of the exemplary access cover of FIG. 9 taken along the vertical plane intersecting line III-III.

As shown in FIG. 3, both blowoff port 26 and gas port 28 are disposed on access cover 24, and preferably are located above the anticipated level of blowoff in containment vessel 22 in order to allow suck-back gases to flow from gas receptacle 16, through gas port 28, into containment vessel 22, through blowoff port 26, and into fermenter 100 without being obstructed by blowoff liquid. As shown in FIGS. 3 and 10, blowoff port 26 may extend below the bottom surface of access cover 24 to provide a drip edge 112 for blowoff. This may direct the flow of blowoff into the interior 80 containment vessel 22, and reduce the likelihood of blowoff migrating along the underside of access cover 24 to potentially escape the containment vessel 22.

In other examples, blowoff port 26 may include a coupling within blowoff vessel 12 that connects to a tube (not shown) that routes flow within the blowoff vessel 12, for example, routing blowoff and gasses to the bottom of the interior 80 of containment vessel 22. This may be useful to redirect the flow of blowoff and gases in certain configurations. Other examples may include a blowoff port 26 positioned on a sidewall or bottom of blowoff vessel 12, and may include an internal tube (not shown) to change the blowoff flow direction. By way of further examples, blowoff port 26 may be located in the bottom of blowoff vessel 12, and a tube (not shown) may extend into containment vessel 22 from the bottom thereof. In such an example, the direction of blowoff flow into blowoff vessel 12 may be directed toward the top of the blowoff vessel 12. To avoid the flow of blowoff outside of containment vessel 22, the access cover 24 may be configured with a baffle deflector to change the direction of flow, or the horizontal distance between the discharge point and the top of containment vessel 22 may be large enough to allow blowoff to settle and separate to liquid and gas components, in order to reduce risk of blowoff escaping from blowoff vessel 12.

As shown in FIGS. 1-3, blowoff vessel 12 comprises a containment vessel 22, the interior 80 of which is in fluid communication with blowoff port 26, and is configured to receive blowoff from fermenter 100. Examples of the containment vessel 22 include an exterior surface 76 and an interior 80, the interior 80 having a volume that is configured to receive and hold blowoff from the fermenter 100. The surface of the interior 80 of containment vessel 22 may be impermeable to water and gases at atmospheric pressure, and at pressures consistent with this disclosure. As shown in FIG. 2, containment vessel 22 may have access opening 30, which is positioned to establish fluid communication between blowoff port 26 and the interior 80 of containment vessel 22. Access opening 30 also may establish fluid communication between containment vessel 22 and gas port 28. In examples, access opening 30 may be sufficiently large to allow a user to harvest the blowoff from containment vessel 22.

Examples of containment vessel 22 may be formed of polyethylene terephthalate (PET) using a blow molded manufacturing process and provides suitable chemical resistance, durability, transparency, and low gas permeability. Alternate materials and manufacturing processes also may be used, as discussed herein and known in the art.

Preferably, the blowoff storage volume of containment vessel 22 is between 0.05 and 100 U.S. gallons, more preferably between 0.1 and 100 U.S. gallons, still more preferably between 0.2 and 10 U.S. gallons, and still more preferably between 0.3 and 1.5 U.S. gallons. Additional storage volume increases space requirements and contains more air that may contract during cooling, which increases the required storage volume of gas receptacle 16. Also, it may be preferable to purge most excess air prior to storage of fermentation gas in gas receptacle 16 in order to reduce the amount of oxygen that is returned to the fermenter during suck-back or cold crashing.

Containment vessel 22 may be a liquid-containing vessel as well as gas-containing. The required blowoff storage volume varies, depending on the batch size of fermented liquid, fermenter size, and expected blowoff volume due to recipe and process variations for fermented food and beverages.

In examples, containment vessel 22 may have an average horizontal cross-sectional area that is at least 2, 4, 10, or 25 times the minimum cross sectional area of blowoff port 26. This increased horizontal cross-sectional area within containment vessel 22 with respect to the horizontal cross-sectional area of blow off port 26 slows the flow of foamy blowoff and provides time and opportunity for separation of the blowoff liquid from fermentation gases. The required expansion varies depending on the size of blowoff port 26, height and shape of containment vessel 22, and anticipated flow rates of blowoff and gases.

In examples, the vertical distance from the bottom of containment vessel 22 to the lowest point along the top perimeter of the containment vessel 22 preferably may be between 1 and 120 inches, more preferably between 2 and 60 inches, still more preferably between 3 and 24 inches, and still more preferably between 4 and 12 inches. Increased vertical distance within blowoff vessel 12 provides opportunity for gravity separation of the blowoff liquid from fermentation gases entering the containment vessel 22 from blowoff port 26, which reduces the potential of blowoff liquid escaping blowoff vessel 12. The required vertical distance varies depending on the volume and shape of blowoff vessel 12 and anticipated flow rates of blowoff and gases.

With reference to FIGS. 2 and 3, an exemplary apparatus 10 further may comprise an airlock vessel 13, comprising a sidewall 84 having an outer wall surface 86 and an inner wall surface 88, and a bottom surface 82, defining an interior. The interior of airlock vessel 13 may be impermeable to water and gases at atmospheric pressure, and at pressures consistent with this disclosure. The airlock vessel 13 is configured to internally receive the containment vessel 22 in the interior of the airlock vessel 13. Airlock vessel 13 may be formed of thin-walled material suitable for a liquid-containing vessel. Examples of airlock vessel 13 may be constructed of polypropylene using an injection molded manufacturing process and provides suitable chemical resistance, durability, and clarity.

As shown in FIG. 2, airlock vessel 13 may comprise latch tabs 68 configured to interact with and removably secure access cover 24. In examples, airlock vessel 13 may include a lip or baffle configured to mate with corresponding grooves on the access cover seal gap 98 of access cover 24, as shown in FIGS. 8 and 19. In examples, this mating may form a gas-tight seal air-tight seal with the access cover 24, however, it is to be understood that examples exist wherein no gas-tight seal is formed where access cover 24 and airlock vessel 13 mate. In examples, air lock vessel 13 also may include one or more handle connections 70 disposed on the exterior sidewall surface 86, configured for attaching one or more handle, such as a rope handle or wire handle (not shown). A handle may provide one-handed lifting of apparatus 10.

With reference to FIG. 3, airlock vessel 13 may be sized and configured to form channel 32 between at least a portion of the exterior surface 76 of containment vessel 22, and at least a portion of the inner wall surface 88 of the sidewall 84 of airlock vessel 13. In examples, channel 32 is proximal to at least the upper, first portion 78 of the exterior surface 76 of containment vessel 22. In examples, channel 32 circumscribes the upper, first portion 78 of the exterior surface 76 of containment vessel 22 and is continuous about it. However, it is to be understood that examples consistent with the present disclosure include channels 32 that do not circumscribe the containment vessel 22, such as wherein the channel 32 is located merely on one side of the containment vessel 22. Channel 32 may define surfaces of airlock 18, and the horizontal width of channel 32 about the upper portion of containment vessel 22 may be sized to accommodate the airlock 18. As shown in the FIGS. 2-3, channel 32 may be comprised of the exterior surface 76 of the containment vessel 22, and the inner wall surface 88 of the sidewall 84 of airlock vessel 13. However, it is to be understood that other examples of channel 32 may exist that are consistent with this disclosure, such as an example wherein channel 32 is comprised of an insert placed between airlock vessel 13 and containment vessel 22.

As shown in FIG. 3, the horizontal width of channel 32 may become smaller near the bottom of containment vessel 22. This reduction may be preferable, because it increases blowoff storage volume in containment vessel 22 without increasing the volume of airlock vessel 13. Further, in an example according to FIG. 3, the width of the channel 32 near the bottom of the apparatus 10 may not impact airlock 18. A portion of channel 32 may be relatively wider near the bottom of airlock vessel 13, in order to facilitate the evacuation of air when the channel is filled with airlock liquid. As shown in FIGS. 2 and 3, this wider portion of channel 32 may be created by concave shaping 110 in the containment vessel 22, although it is to be understood that convex shaping may be additionally or alternatively on the airlock vessel 13. The containment vessel 22 may include shaping 110 configured to create a wider portion of the channel 32, which preferably may be located below airlock liquid fill port 42 in access cover 24. However, in examples the sider portion of channel 32 may be located anywhere around the perimeter of the containment vessel 22. It is to be understood that examples exist without the wider portion in the channel 32 and/or shaping 110 on the containment vessel.

As shown in FIGS. 1-3, walls of the blowoff vessel 12, the containment vessel 22, and/or the airlock vessel 13 may be formed as rounded surfaces, as such surfaces may easier to clean than sharp corners. However, it is to be understood that this example is non-limiting, and all suitable shapes are contemplated. Alternate examples of blow-off vessel 12, the containment vessel 22, and/or the airlock vessel 13 may be cylindrical, cube-shaped, or any other shape capable of forming a vessel to receive and store blowoff consistent with the present disclosure.

With reference to FIGS. 1-3, blowoff vessel 12 comprises access cover 24. Blowoff port 26 and gas port 28 may be disposed on access cover 24. Examples of access cover 24 may be formed of thin-walled material. In examples, access cover 24 may be formed of polypropylene using an injection molded manufacturing process and provides suitable chemical resistance, durability, clarity, and the ability to form a living hinge for access cover latches 66. As discussed herein, alternate materials are envisioned. Alternate manufacturing processes also may be used, as understood in the art. It also is to be understood that alternative examples of blowoff vessel exist that do not require access cover 24. For example a blowoff vessel may be a substantially sealed disposable plastic bottle having a small diameter neck with a first port (i.e., a blowoff port) to provide fluid communication between a fermenter and the blowoff vessel. As an option, a second port (i.e. a gas port) may provide fluid communication between the blowoff vessel and a gas receptacle.

Access cover 24 is configured to cover containment vessel 22, and may mate with blowoff vessel 12 and/or airlock vessel 13. Access cover 24 may be configured to form a substantially gas tight seal with airlock vessel 13. Access cover 24 may be removably attachable to allow removal of containment vessel 22 from airlock vessel 13 and to provide access to the interior of the airlock vessel 13 and containment vessel 22 for cleaning and sanitizing, or for harvesting blowoff after operation. When apparatus 10 is in service during fermentation, access cover 24 may be restrained in a substantially fixed position indicated in FIGS. 1 and 3. The restraining of access cover 24 maintains the position of the access cover 24 by withstanding the force exerted by the operating pressure of blowoff vessel 12 and the force exerted by flotation of containment vessel 22 within airlock vessel 13. The flotation force occurs when channel 32 is filled with airlock liquid, as described herein.

In examples, access cover 24 may be restrained by the coaction of access cover latches 66 with latch tabs 68 positioned on airlock vessel 13. Access cover latches may be hinged to allow them to rotate and latch onto latch tabs 68 on airlock vessel 13, as shown in FIG. 1. Additionally or alternatively, the rim of the access cover may attach to the rim of the airlock vessel. This may be accomplished using a "snap on" interference fit, or the coaction of channels on the access cover 24, such as access cover seal gap 98 shown in FIGS. 8 and 10, and corresponding ridges on the rim of airlock vessel 13. The channels may include an o-ring or grommet to substantially seal the coaction of access cover 24 and airlock vessel from the passage of gases. Other examples may include other latching systems, threaded connections, friction-only fit attachments, interference alignment systems, buckles, or other methods known in the art. With reference to FIGS. 6-10, access cover 24 may include one or more access cover handle 96 configured to aid a user in removing an access cover 24 that is affixed to airlock vessel 13.

Access cover 24 may comprise skirt 34, which may extend from the underside of access cover 24. As shown in FIGS. 2-3 and 6-10, skirt 34 may be positioned on the underside of access cover 24 at a sufficient distance inside of the outer rim of access cover 24 to allow apparatus on the access cover 24 to mate with corresponding apparatus on airlock vessel 13 to restrain the access cover 24 thereon. Skirt 34 may extend continuously from a position that is internal to the perimeter of the access cover 24. Skirt 34 may comprise an inward surface 94 and an outward surface 92. The position and size of skirt 34 is coordinated with channel 32 such that, when access cover 24 is in place, as indicated in FIG. 3, the bottom of the skirt 34 extends into the channel 32. When the access cover 24 is positioned and mated with the airlock vessel 13, skirt 34 effectively divides the entire upper portion of the channel longitudinally into inner channel 36 and outer channel 38. As shown in FIG. 3, outer channel 38 may be defined by the first portion 90 of the inner wall surface 88 of the sidewall 84 of the airlock vessel 13 and the outward surface 92 of the skirt 34. Inner channel 36 may be defined by the first portion 78 of the exterior surface 76 of the containment vessel 22 and the inward surface 94 of the skirt 34. While, in FIGS. 2-3, skirt 24 is integral with access cover 24, it is to be understood that other examples of skirt 34 consistent with the present disclosure exist, such as wherein skirt 34 is integrally formed with at least a portion of containment vessel 22, or is a detachable insert.

Access cover 24, skirt 34, and channel 32 coact to provide the structure to form airlock 18. To complete the airlock, channel 32 is partially filled with airlock liquid, such as water, to a level that that at least partially covers or submerges skirt 34. The airlock liquid substantially seals the volume within blowoff vessel 12 from the ambient atmosphere, thereby creating an air-locked blowoff vessel 12. Airlock 18 also provides a seal of access opening 30 of containment vessel 22 from ambient atmosphere, so access cover 24 may not require other structure to provide a substantially gas-tight seal of the access cover to containment vessel 22.

In examples of apparatus 10, and with reference to FIGS. 1-3, airlock 18 may replace the function of a known airlock that would otherwise be necessary on a fermenter 100 in order to form an air-locked fermentation vessel. Moving the airlock function from the fermenter 100 to apparatus 10 may reduce likelihood of contamination of the fermenting liquid with airlock liquid. Examples of airlock 18 also may provide more airlock liquid than a known airlock installed at the fermenter 100, and thus may maintain a seal for an extended duration without drying due to evaporation of the airlock liquid. This may be advantageous for tasks that required increased time, such as bulk aging of a fermented beverage. Access cover 24 may extend over channel 32 to help reduce the evaporation of airlock liquid as well as reduce the potential for airborne contamination to enter the channel.

With reference to FIG. 3, access cover 24 may include an airlock liquid fill port 42 located above outer channel 38. Airlock liquid, such as water, may be added to channel 32 to while the access cover 24 is affixed to airlock vessel 13.

Thus allows the airlock 18 may be filled to the desired fill level, which may be indicated by a fill line (not shown) on the side of airlock vessel 13. As stated above, it may be desirable in examples if airlock vessel 13 to be transparent or translucent, so that the proper airlock liquid fill level may be verified easily with the access cover 24 in place over the airlock vessel 13. Having access cover 24 latched to airlock vessel 13 during filling of airlock 18 secures containment vessel 22 against flotation forces that may develop as airlock liquid is added. Airlock liquid fill port 42 also allows airlock liquid to be topped off during long term use, as needed. To reduce the potential for airlock contamination, airlock liquid fill port 42 may covered by airlock liquid fill plug 43. Preferably, fill port 42 may be positioned on access cover 24 outside of the perimeter of skirt 34, so fill plug 43 does not need a gas tight seal to maintain an air locked blowoff vessel 12. However, it is to be understood that examples according to the present disclosure may not include airlock liquid fill port 42 and airlock liquid fill plug 43.

As shown in FIGS. 2 and 3, examples of access cover 24 may include containment vessel vent 72 that provides clearance between the top of containment vessel 22 at access opening 30, and the underside of access cover 24. Containment vessel vent 72 may comprise a stepped up portion of the access cover 24 positioned along the rim of containment vessel 22. Preferably, the containment vessel vent 72 may be separated from blowoff port 26 as shown. Containment vessel vent 72 allows pressurized gases to flow from the interior of containment vessel 22 to inner channel 36 of airlock 18. However, it is to be understood that in various examples containment vessel vent 72 may include one or more ridges on the underside of access cover 24, positioned above containment vessel 22 to create space for the flow of gases between the containment vessel 22 and the access cover 24. According to another example, containment vessel vent 72 may be positioned on containment vessel 22 by providing one or more notches or perforations in the top of containment vessel 22 to allow the flow of gases between the containment vessel 22 and the access cover 24 via access opening 30.

The approximate maximum operating pressure of blowoff vessel 12 is set by the operating depth of airlock liquid. This depth may be measured from the bottom of skirt 34 (from the highest point along the bottom perimeter of the skirt) to the top surface of the airlock liquid when the airlock is relieving pressure by allowing excess gases to escape to the ambient atmosphere. When the airlock 18 is relieving pressure, the airlock liquid in inner channel 36 will be forced down by the pressure from gases in the containment vessel 22, causing the liquid to flow under skirt 34 from the inner channel 36 into outer channel 38, until gas bubbles are able to pass under the skirt. This flow of airlock liquid from inner channel 36 to outer channel 38 increases the depth of the airlock liquid within the outer channel. The increase in depth may be calculated using the effected volumes within the inner and outer channels, so the configuration of channel 32, position of skirt 34 within the channel, and fill level of airlock liquid are adjusted to set the relief pressure.

When airlock 18 is relieving pressure from containment vessel 22, excess gases flow under skirt 34 and into outer channel 38. In examples, skirt 34 may include one or more skirt notches 46 at the bottom of the skirt, as shown in FIGS. 2, 6-6, and 9. Skirt notches 46 may provide preferential locations for the flow of gases under the skirt, because they are less submerged in airlock liquid than the bottom of the skirt elsewhere about the perimeter of the skirt. Preferably, skirt notches 46 may be positioned on the same side of the access cover 24 as blowoff port 26, and on the opposite side of containment vessel vent 72.

With reference to FIGS. 2-3 and 6-10, examples of access cover 24 may include one or more vent ports 39 positioned above outer channel 38. Vent ports 39 allow excess gases to flow from the outer channel 38 of airlock 18 to the ambient atmosphere. Vent ports 39 may be small holes in the access cover 24 that are located outside the perimeter of skirt 34. The holes of vent ports 39 preferably may be small enough to help dissipate airlock liquid foam, allowing the gases to escape and the liquid to drain back into channel 32. Alternative examples may vent to the ambient atmosphere using vent ports 39 at the top of airlock vessel 13 or by providing a gap between the top of the airlock vessel 13 and access cover 24.

As shown in FIGS. 2 and 3, the top surface of airlock vessel 13 may be positioned higher than the top of containment vessel 22, and/or the access opening 30 of the containment vessel 22, and access cover 24 may be stepped up accordingly above outer channel 38. This configuration provides additional volume for airlock liquid in the outer channel, and may avoid spills when the airlock is relieving pressure. If airlock 18 is overfilled with airlock liquid, vent ports 39 above outer channel 38 serve to release the excess liquid from the outer channel and may help prevent over-pressurization of the fermenter 100, blowoff vessel 12, or gas receptacle 16.

The approximate maximum operating vacuum of blowoff vessel 12 is set by the operating depth of airlock liquid. Under vacuum conditions, such as suck-back in fermenter 100, when the airlock 18 is relieving vacuum, the airlock liquid in inner channel 36 will be drawn up by the vacuum, causing the liquid in outer channel 38 to flow under skirt 34 and into the inner channel, until gas bubbles are able to pass under the skirt. This increases the depth of the airlock liquid within the inner channel 36. The configuration of channel 32, position of skirt 34 within the channel 32, and fill level of airlock liquid are adjusted to set the relief vacuum in conjunction with setting the relief pressure as described previously.

If airlock 18 is overfilled with airlock liquid, containment vessel vent 72 may allow airlock liquid to flow from inner channel 36 into containment vessel 22 to relieve excessive vacuum in blowoff vessel 12. This helps prevent collapse of the fermenter 100 or blowoff vessel 12 due to excessive vacuum. This configuration may protect fermenting liquid in fermenter 100 from contamination from microbes in the airlock liquid, as the airlock liquid may be captured in available volume in the containment vessel 22.

Airlock 18 may be configured to set the airlock relief pressure in coordination with gas receptacle 16. According to the example of FIGS. 1-3, the relief pressure preferably is set high enough to achieve inflation of gas receptacle 16 before relieving pressure, yet low enough to prevent bursting of the gas receptacle 16 due to over pressurization. Similarly, airlock 18 may be configured to set the airlock relief vacuum in coordination with gas receptacle 16. The relief vacuum preferably is set high enough to deflate gas receptacle 16 before relieving vacuum, yet low enough to prevent damage to the blowoff vessel due to excessive vacuum.

As shown in FIGS. 1-2, an example of gas receptacle 16 may be a nonporous flexible material forming a closed and gas-tight container that can be inflated and deflated. Preferably, gas receptacle 16 may comprise is plastic film material with low oxygen and carbon dioxide permeability, but it is to be understood that all suitable materials are contemplated.

Examples of gas receptacle 16 also may be latex, but preferably the gas receptacle 16 does not stretch elastically during inflation, because such a configuration may tend to deflate when pressure within the system is reduced, such as when the fermenter 100 is opened to add post-fermentation hops during beer brewing. Preferably, the gas storage volume of gas receptacle 16 is between 20 and 50,000 cubic inches, more preferably between 50 and 20,000 cubic inches, still more preferably between 75 and 5,000 cubic inches, and still more preferably between 100 and 2,000 cubic inches, depending on the fermentation batch size, fermenter headspace volume, fermentation temperature, and cold crash temperature.

An example of gas receptacle 16 according to FIGS. 1 and 2 may be formed from a single sheet of film material that is folded to form the bottom of the receptacle 16. The overlapping material is then sealed along the sides and top to complete the enclosure. Alternative examples of 16 may include configurations wherein, the bottom of the gas receptacle 16 has a separate end panel with seams at the sides. As another example, gas receptacle 16 may be formed from two sheets of film material with a pouch type fitment at the bottom of the receptacle 16. The sides and top of the gas receptacle 16 may be sealed as s well, as described herein.

As shown in FIG. 3, gas receptacle 16 comprises a receptacle port 50, which is an opening in the gas receptacle 16 for receiving fermentation gases through gas port 28. Receptacle port 50 may be positioned on gas receptacle 16 proximally to gas port 28. Receptacle port flange 52 is attached to gas receptacle 16 about receptacle port 50. Receptacle seal 56 is the sealing attachment of receptacle port flange 52 to gas receptacle 16. Gas tube seal 58 provides a substantially gas-tight seal of receptacle port flange 52 with gas port 28. This assembly provides a substantially sealed coupling of gas receptacle 16 to gas port 28.

Receptacle port flange 52 may be a rigid or semi-rigid sheet material, such as plastic, metal, or other sheet material, sized and configured for providing a seal of gas receptacle 16 at receptacle port 50, and for installation of gas tube seal 58. In an example, receptacle port flange 52 may be a circular shape of flat plastic sheeting with a circular aperture in the center. In another example, receptacle port flange 52 may include a bag fitment spout. Yet another example may use a bag fitment spout having a substantially gas-tight threaded cap on the spout, with the cap serving as receptacle port flange 52. The cap may have a circular aperture.

Receptacle seal 56 may be the attachment of gas receptacle 16 to receptacle port flange 52. Receptacle seal 56 may extend around the entire perimeter of receptacle port 50, forming a gas-tight seal. This seal may be accomplished with radio frequency welding, heat sealing, adhesives, or other suitable techniques in the art, based on the materials involved.

With continued reference to FIGS. 2 and 3, receptacle port flange 52 has an aperture within the bag seal perimeter for installation of gas tube seal 58. Gas tube seal 58 may be a grommet formed of synthetic rubber or other elastomeric material, and configured for installation at the aperture of receptacle port flange 52. In examples, gas tube seal 58 also may install on the exterior of connection protraction 102 of gas port 28, which is shown in FIGS. 3, 9, and 10. Gas tube seal 58 is configured for providing a substantially gas-tight seal of the receptacle port flange 52 with gas port 28.

Additional examples are contemplated for providing a substantially sealed coupling of gas receptacle 16 to gas port 28 that is sufficient to limit the flow of ambient gas into the gas receptacle, and to limit the escape of fermentation gases from the gas receptacle 16 under the pressures consistent with this disclosure. For example, receptacle port flange 52 may comprise an elastomeric coupling that provides a seal with gas port 28, thereby eliminating gas tube seal 58. As another example, if a bag fitment spout is used for receptacle port flange 52, then gas tube seal 58 may be short length of elastomeric tubing inserted into the fitment spout and sized to form a substantially gas-tight seal between the inside of the fitment spout and the outside of gas port 28. It is to be understood that all other suitable connections that are used in the art are also contemplated.

It is to be understood that examples of gas receptacle 16 exist wherein the gas receptacle is not inflatable. In such examples, the gas receptacle may be a rigid container in fluid communication with the blowoff vessel 12, and comprising an airlock. The interior of this exemplary gas receptacle may include one or more baffles, creating a convoluted fluid path from the blowoff vessel 12 to the airlock. Thus, fermentation gases may be stored in this alternative example during fermentation, and returned to the fermenter 100 during suck-back with limited contamination from ambient air.

With reference to FIGS. 3 and 9-10, examples of gas port 28 may include an integral tapered-tube coupling protrusion 102 on the outside of blowoff vessel 12 that provides a substantially gas-tight seal with receptacle port flange 52 using gas tube seal 58. The taper allows the fit with gas tube seal 58 to become tighter as gas port 28 extends farther into the aperture of receptacle port flange 52. By way of other examples, an exemplary gas port 28 may be an aperture only, as shown in FIGS. 6-8, without any coupling. In this example, a substantially gas-tight seal at gas port 28 may be accomplished using a rigid tube inserted through an elastomeric grommet, not shown, installed at gas port 26. A rigid tube according to this example may also provide a substantially gas-tight seal with receptacle port flange 52 using gas tube seal 58. As another example, if gas port 28 is an aperture without a coupling, a threaded bulkhead fitting may seal gas port 28 and have a tapered end that provides a seal with receptacle port flange 52 using gas tube seal 58. As yet another example, a fitting may have a section of rigid tube with an annular shoulder and an elastomeric gasket on the top (i.e., the external surface) of access cover 24, and a threaded end of the tube with a nut on the bottom (inside) of the access cover 24. All other suitable connections that are used in the art are also contemplated.

With reference to FIGS. 2-3, a gas tube 14 may be inserted into the gas port 28, and fermentation gases may flow through the gas tube 14. Examples of gas tube 14 may include a rigid or semi-rigid tubing that conveys gases from gas port 28 into gas receptacle 16. Examples of gas tube 14 also may include flexible tubing. The connection of gas port 28 to gas tube 14 may be within gas receptacle 16, so a gas-tight seal at the connection is not required. Examples of a connection between gas tube 14 and gas port 28 connection need not be gas-tight as well, as long as gas receptacle 16 is sealed with a gas tight seal to gas port 28 (for example, to connection protrusions 102 of FIGS. 9 and 10). These examples may be desirable since they provide additional flow path for gases to evacuate gas receptacle 16 into gas port 28. This "loose coupling" may be accomplished using a longitudinal groove within the lumen of gas port 28 to avoid a tightly sealed connection with gas tube 14.

With reference to FIG. 2, exemplary gas tube 14 may have at least one gas tube orifice 54 within gas receptacle 16. If the gas tube orifice 54 becomes obstructed by gas receptacle material during suck-back, fermentation gases may continue to be evacuated through the "loose coupling" of gas tube 14 to gas port 28. Additional examples may include perforations along the length of gas tube 14. Another example may eliminate gas tube 14, and removably affix gas receptacle 16 to gas port 28 (such as to connection protrusions 102 of FIG. 9) to form a gas-tight seal.

With continued reference to FIG. 2, in examples gas tube 14 may extend into gas receptacle 16 at least 10, 25, 50, 70, or 85 percent of the height of the gas receptacle 16 from gas port 50 to the top of the gas receptacle, depending on the size, shape, and material of gas receptacle 16. An alternative example may use a flexible gas tube with a gas receptacle 16 hanging from the gas tube. In this case, the gas tube would not need to extend inside the gas receptacle 16 except to provide fluid communication with gas receptacle 16.

Examples of gas tube 14 and/or gas receptacle 16 may be disposable, or reusable with proposer sanitizing.

Figure 11:
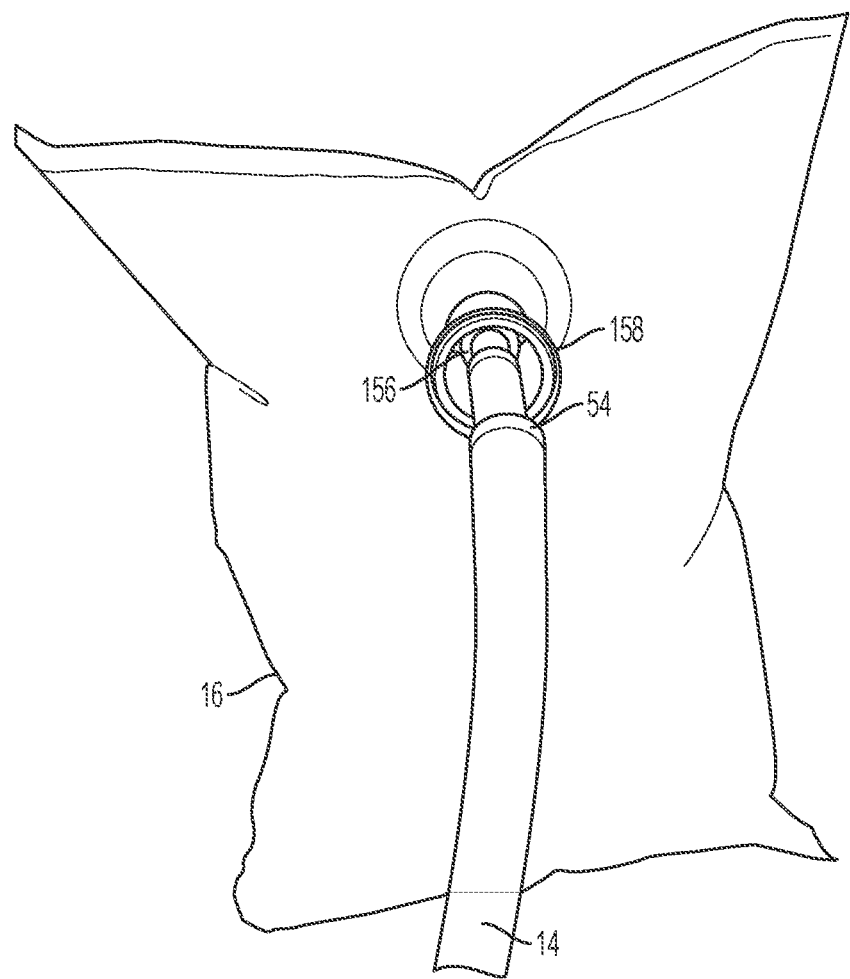
FIG. 11 is a plan view of an exemplary gas receptacle and portion of gas tube consistent with the present disclosure.

With reference to FIG. 11, in an example, gas receptacle 16 may include a tube connect port 158 that is configured to mate with orifice 54 of gas tube 14 so that the tube 14 does not extent into gas receptacle 14. Tube connect port 158 may include a raised orifice 156 that is configured to insert into the lumen of the gas tube 14 at the gas tube orifice 54 in order to create a substantially gas-tight seal. Alternatively, gas tube 14 may insert into a port or orifice of tube connect port 158 to create a seal, or the tube connect port 158 and the gas tube 14 may mate via connector, or by any other manner known in the art consistent with this disclosure.

In addition to conveying gases, gas tube 14 provides structural support for the gas receptacle 16, supporting its orientation whether the gas receptacle is deflated or inflated. Receptacle port 50 and receptacle port flange 52 are located at the folded bottom of gas receptacle 16, such that the gas receptacle 16 has a generally vertical orientation when the gas receptacle is inflated and supported by gas tube 14. Alternate examples are contemplated using other couplings, materials, and orientations of components.

During initial fermentation, or at other time, it may be desired to cap gas port 28 with gas port cap 29 and operate airlock/blowoff vessel assembly 74 without gas receptacle 16. Airlock/blowoff vessel assembly 74 includes airlock vessel 13, blowoff vessel 12, gas port cap 29 and airlock liquid fill plug 43. As shown in FIG. 2, gas port 28 may be capped by gas port cap 29, or gas tube 14 may be inserted into the open end of the gas port. When the gas port is capped by gas port cap 29, it may provide a gas-tight seal on gas port 28. When gas port 28 is capped, the flow of gases through gas port 28 is stopped, and fermentation gases will be expelled, or ambient atmosphere drawn, through airlock 18 at the appropriate pressure. Alternative examples may use a plug or bung instead of a cap 29 to seal gas port 28.

Blowoff-containment and gas-storage apparatus 10 may be used in conjunction with fermentation of a beverage. For example first, in order to reduce the risk of introducing undesirable microbes into the fermented liquid, a brewer may sanitize all components of apparatus 10 prior to use by submerging them in food-grade sanitizer solution and draining.

Figure 4:
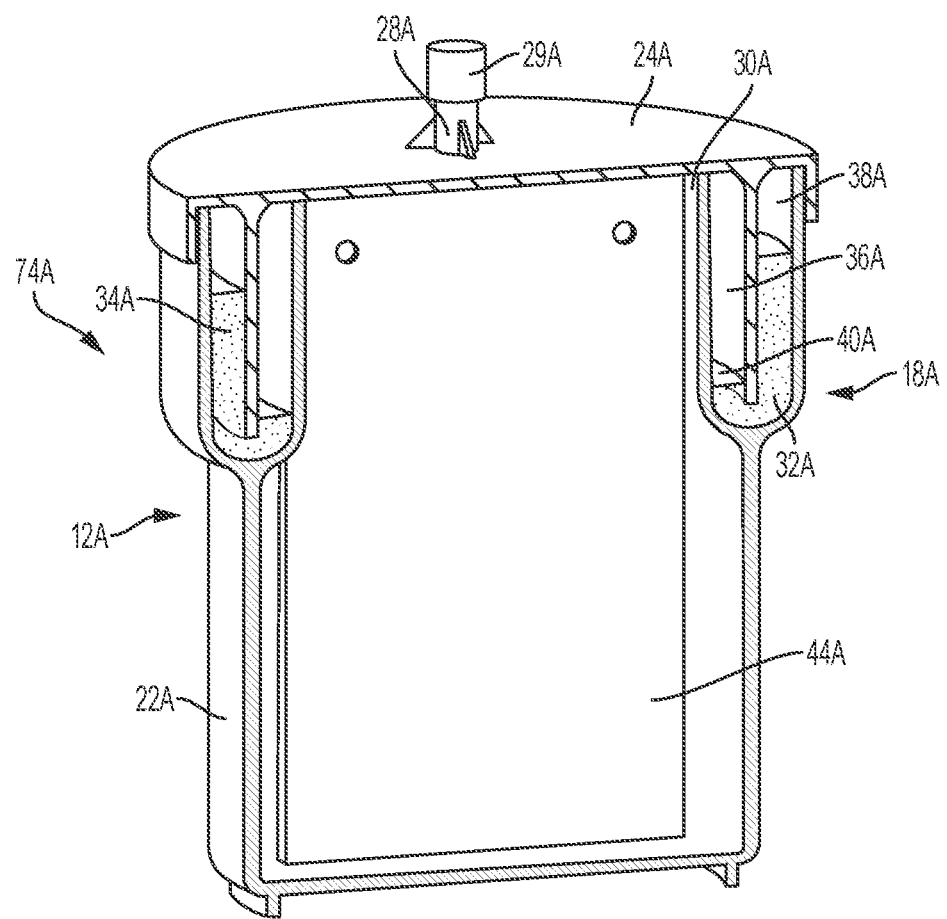
FIG. 4 is a perspective view of a cross-section of another exemplary apparatus according to the present disclosure.

FIG. 4 depicts an additional example of air-locked blowoff vessel assembly 74A consistent with the present disclosure. For clarity, certain elements are not shown due to the section cut, such as a blowoff port and blowoff tube. However, it is to be understood that the example of FIG. 4 may be combined with other features disclosed herein, to the extent consistent with this disclosure. For example, while not depicted in FIG. 4, it is to be understood that blowoff port is located on access cover 24A within the portion of the cover that has been removed for the section, and the blowoff tube makes a gas tight connection with the blowoff port, as shown and discussed with respect to FIGS. 1-3.

With reference to FIG. 4, assembly 74A comprises an air-locked vessel that includes blowoff vessel 12A, airlock 18A, and gas port cap 29A. During operation, assembly 74A is in fluid communication with a fermenter 100 (not shown) via a blowoff tube 29 and blowoff port 28, which as stated above, are omitted from FIG. 4 for clarity. Blowoff vessel 12A receives blowoff and gases from the fermenter 100 during fermentation of a beverage. Blowoff liquid is substantially contained within blowoff vessel 12A while the gases flow through the blowoff vessel 12A to airlock 18A. Gas port cap 29A is installed on gas port 28A to stop the flow of gases through the gas port. Airlock 18A releases gases to the ambient atmosphere, as discussed herein with respect to Airlock 18 of FIGS. 1-3.

Assembly 74A is similar to airlock/blowoff vessel assembly 74 of the example according to FIG. 2. Blowoff vessel 12A is a substantially sealed vessel (excluding ports) that includes containment vessel 22A, access cover 24A, gas port 28A, and the blowoff port (not shown). Containment vessel 22A has within its interior a volume for blowoff containment and an access opening, similar to the example of FIGS. 1-3. The interior of blowoff vessel 12A may be fully or partially circumscribed by channel 32A, wherein the channel is continuous about at least a portion of an access opening 30A of the containment vessel 22A. However, Channel 32A is formed integrally to the exterior of the blowoff vessel 12A, and forms a portion of airlock 18A.

As shown in FIG. 4, channel 32A extends from the access opening 30A of containment vessel 22A, down at least a portion of the exterior of at least a portion of containment vessel 22A. However, it is to be understood that examples exist in which channel 32A may extend to the bottom of the exterior of containment vessel 22A, such that the bottom of the channel forms part of the bottom of containment vessel 22A. Other example may vertically align the interior wall of channel 32A with the wall below the channel, forming an outboard channel, or vertically align the exterior wall of channel 32A with the wall below the channel, forming an inboard channel.

In the example according to FIG. 4, access cover 24A covers the access opening of containment vessel 22A and channel 32A. Access cover 24A is removable to provide access to the interior of containment vessel 22A for cleaning or other access. When assembly 74A is in use during a fermentation, access cover 24A may be restrained in a substantially fixed position against blowoff vessel 12A. To restrain access cover 24A, the rim of the cover extends over, and attaches to, the top, outside edge of containment vessel 22A.

Access cover 24A may comprise a skirt 34A that is continuous about the at least a portion of the perimeter of the access cover 24A. Skirt 34A is coordinated with channel 32A such that, when access cover 24A is in place, the bottom of the skirt 34A extends into the channel 32A. Skirt 34A effectively divides the entire upper portion of the channel longitudinally into inner channel 36A and outer channel 38A.

Access cover 24A, skirt 34A, and channel 32A provide the structure to form airlock 18A. To complete the airlock, channel 32A is partially filled with airlock liquid 40A, such as water, to a level that covers at least a portion of skirt 34A.

A containment vessel vent, not shown, allows pressurized gases to flow from the interior of containment vessel 22A to inner channel 36A. This vent may comprise a notch at the top of inner channel 36A located on the same side of baffle 44A as gas port 28A, and on the opposite side of baffle 44A as the blowoff port, or as is otherwise consistent with this disclosure. Similarly, exemplary airlock 18A may vent to the ambient air from a notch at the rim of outer channel 38A located on the same side of baffle 44A as gas port 28A, and on the opposite side of baffle 44A as a blowoff port, or as otherwise consistent with this disclosure With continued reference to FIG. 4, assembly 74A further includes a baffle 44A. Baffle 44A is a sheet of material within containment vessel 22A between the blowoff port and gas exit vents and/or air entrance points (not shown). Baffle 44A may be removable for ease of cleaning, and held in position by guides, tabs, or otherwise within containment vessel 22A. Baffle 44A has holes near the top to allow gases to pass through when the bottom portion of containment vessel 22A is filled with blowoff. Alternate examples may provide a baffle with a different configuration, multiple baffles, or a spiral baffle to increase the flow path between the blowoff port and gas exit points and/or air entrance points.

Baffle 44A may facilitate the purging of air from the assembly 74A by reducing short-circuiting, which helps the fermentation gases flush out the air. During suck-back of gases, baffle 44A helps increase the percentage of fermentation gases, and reduce the percentage of air, the mixture of gases that returns to the fermenter 100, compared to a completely mixed volume of gases within blowoff vessel 12A. Baffle 44A also may reduce the likelihood of blowoff foam reaching gas port 28A or the top of channel 32A by restricting the movement of foam from the side of containment vessel 22A having the blowoff port to the side having gas exit points.

Figure 5:
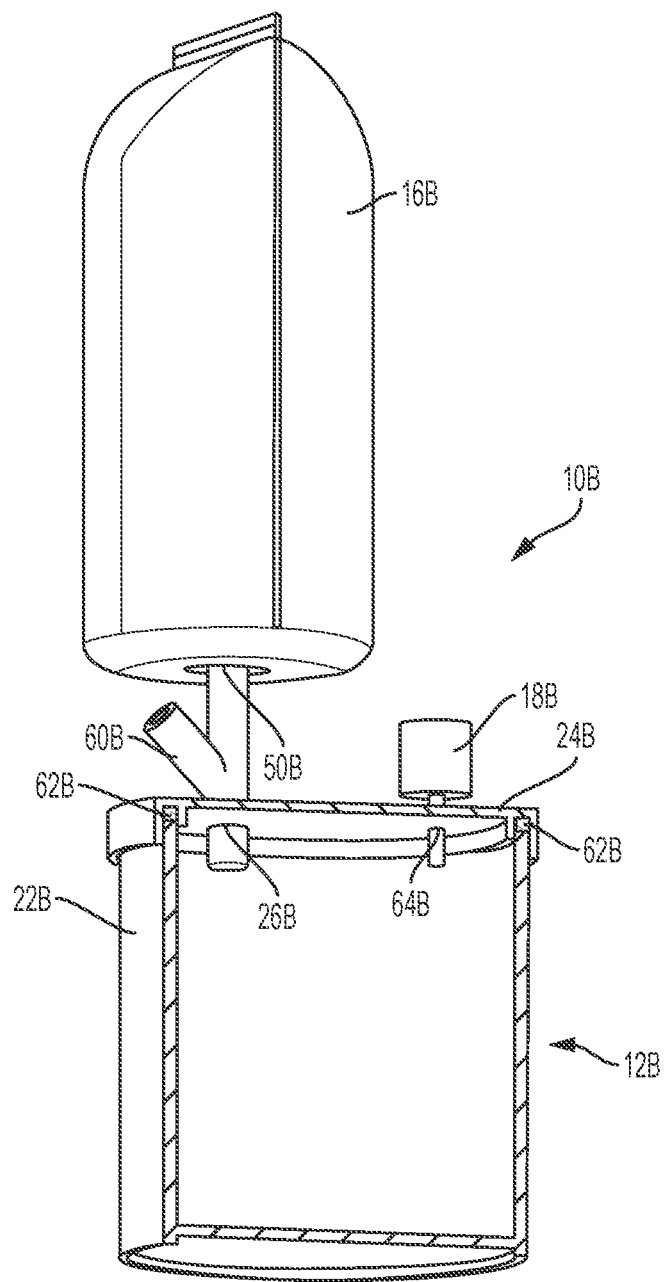
FIG. 5 is a perspective view of a partial cross-section of a further exemplary apparatus according to the present disclosure.

FIG. 5 depicts an example of a blowoff containment and gas storage apparatus 10B consistent with the present disclosure. While features according to this example are not depicted in FIG. 5 for clarity, it is to be understood that the example of FIG. 5 may be combined with other features disclosed herein, to the extent consistent with this disclosure.

With continued reference to FIG. 5, apparatus 10B includes blowoff vessel 12B, gas receptacle 16B, blowoff fitting 60B, and airlock 18B. During operation, apparatus 10B is in fluid communication with a fermentation vessel (not shown) via a blowoff tube (not shown) that connects to blowoff fitting 60B. Blowoff fitting 60B receives blowoff and gases from a fermentation vessel during fermentation of a beverage. Blowoff may be discharged into blowoff vessel 12B and substantially contained therein. Gases flow through blowoff fitting 60B into gas receptacle 16B, which may inflate to provide storage of the gases. Airlock 18B releases excess gases to the ambient atmosphere. After fermentation, when the fermentation vessel is cooled, fermenter suck-back causes gas receptacle 16B to at least partially deflate. Stored gases within gas receptacle 16B flow back to the fermenter 100 through blowoff fitting 60B.

Blowoff vessel 12B may be a substantially sealed vessel that includes containment vessel 22B, access cover 24B, cover seal 62B, blowoff port 26B, and airlock port 64B. Access cover 24B is removable to provide access to the interior of containment vessel 22B for cleaning or other access. When apparatus 10B is in use during fermentation, access cover 24B may be restrained in a substantially fixed position over containment vessel 22B. To restrain access cover 24B, the rim of the access cover 24B may extend over, and attach to, the top, outside edge of containment vessel 22B. Cover seal 62B may include an O-ring that provides a substantially gas-tight seal of access cover 24B with containment vessel 22B. In examples herein including access cover 24, an or-ring may be disposed in access cover seal gap 98 of FIGS. 8 and 10 as well. Alternative examples may use a gasket, packing, baffling, or another type of seal.

According to examples, blowoff fitting 60B may comprise a tube fitting in fluid communication with the fermenter 1000, blowoff vessel 12B, and gas receptacle 16B. Blowoff fitting 60B receives blowoff and gases from the fermenter 100 via a blowoff tube (not shown), which connects in a gas tight manner to blowoff fitting 60B at a location on the fitting that is between blowoff vessel 12B and gas receptacle 16B. In FIG. 5, this connection location is the open end of blowoff fitting 60B above access cover 24B.

Blowoff liquid and gases may be separated by gravity before, during, or after they enter blowoff fitting 60B, with the liquid draining into blowoff vessel 12B, and at least some gases entering gas receptacle 16B. A substantially gas-tight seal is provided at blowoff port 26B where blowoff fitting 60B couples to blowoff vessel 12B. This seal may be accomplished in a variety of ways as discussed herein.

A substantially gas-tight seal may be provided at receptacle port 50B where blowoff fitting 60B couples to gas receptacle 16B. This seal may be accomplished using a receptacle port flange and gas tube seal at receptacle port 50B, as described elsewhere herein with respect to FIGS. 1-3. Blowoff fitting 60B may provide at least some structural support for gas receptacle 16B, but blowoff fitting 60B does not extend inside the gas receptacle 16, except to provide fluid communication with gas receptacle 16B. In an alternative example, a gas tube may extend from blowoff fitting 60B into gas receptacle 16B for support, as discussed herein with respect to gas tube 14 of FIG. 2.

With continued reference to FIG. 5, airlock 18B may be disposed fluid communication with blowoff vessel 12B, making the blowoff vessel 12A an air-locked vessel. A substantially gas-tight seal, may be provided at airlock port 64B where airlock 18B couples to blowoff vessel 12B. This seal may be accomplished using an elastomeric grommet at airlock port 64B. For another example, airlock 18B may not be strictly required; however, if airlock 18B is not included, gas receptacle 16B should be sized to store enough gas to avoid over-pressurizing blowoff vessel 12B and the fermenter. Further, if airlock 18B is not included, it is desirable for gas receptacle 16B to store a sufficient volume of gas and supply enough gas during suck-back to avoid excessive vacuum within blowoff vessel 12B and the fermenter.

With reference to FIG. 5, airlock 18B may comprise a standard 3-piece liquid-filled airlock. However, alternative examples may use any of wide range of airlocks, such as check valves, one way valves, backflow prevention devices, backdraft dampers, vent valves, pressure-venting membrane slits, pressure relief valves, pressure relief dampers, microbe barrier filters, or other types known in the art. Preferably the airlock does not allow ambient air to flow into the blowoff vessel at vacuums that are as low as or lower than the vacuum required to deflate gas receptacle 16B, because this may return air to the fermenter during suck-back.

According to the present disclosure, and with reference to FIGS. 1-3, a brewer may use apparatus 10 in conjunction with fermentation of a beverage. The brewer places containment vessel 22 within airlock vessel 13. The brewer then installs access cover 24 by placing it on the top of airlock vessel 13 and latching access cover latches 66 to latch tabs 68. The brewer then pours airlock liquid through airlock liquid fill port 42 to fill channel 32 to the level indicated by the fill line that is marked on the side of airlock vessel 13. The fill line level has been selected to cover the bottom of skirt 34 and skirt notch 46, and to provide the appropriate pressure and vacuum range for airlock 18. Having access cover 24 latched in place during filling may prevent containment vessel 22 from floating out of airlock vessel 13 as airlock liquid, such as water, is added. However, if the brewer prefers, some or all of the airlock liquid may be added prior to installing the access cover.

The brewer may plug airlock liquid fill port 42 with airlock liquid fill plug 43 to reduce the potential for airlock contamination. The brewer may install gas port cap 29 on gas port 28 to provide a substantially gas tight seal of the gas port, preventing gas from flowing through the port. At this point, blowoff vessel 12 is sanitized and air-locked, and the assembled components form airlock/blowoff vessel assembly 74.

To facilitate mobility of the airlock/blowoff vessel assembly, the brewer may tie a rope handle to handle connections 70. The brewer uses the rope handle to place the airlock/blowoff vessel assembly 74 near the fermentation vessel and connects one end of sanitized blowoff tube 20 to blowoff port 26, and the other end to a port on the fermenter 100. Both connections may be sealed substantially gas-tight, and at this point, the fermenter 100 may be air-locked via airlock/blowoff vessel assembly 74.

When active fermentation begins, fermentation gases are generated, and the gas pressure within blowoff vessel 12 increases. This pressure is exerted on the top surface of the airlock liquid in inner channel 36, because containment vessel vent 72 provides a passageway for the flow of gases from containment vessel 22 to inner channel 36. As the pressure increases, the airlock liquid in channel 32 is at least partially displaced from inner channel 36 to outer channel 38.

When gas pressure causes the airlock liquid level in inner channel 36 to drop to the level of skirt notches 46, gas bubbles flow through the skirt notches. It may be desirable for a brewer to see these gas bubbles through the side walls of transparent or translucent airlock vessel 13. Skirt notches 46 allow the brewer to focus attention on these particular locations for a visual confirmation of fermentation activity, instead of scanning the entire bottom perimeter of skirt 34 while waiting to see a bubble. In examples wherein the airlock vessel 13 is transparent or translucent, airlock/blowoff vessel assembly 74 provides visual indication of active fermentation via bubbles at skirt notches 46.

Prior to fermentation, the headspace within the fermenter 100 and the volume within blowoff vessel 12 are initially filled with air. As such, it may be desirable to allow fermentation to progress for some time, to allow fermentation gases to force air out of the assembly 74, prior to removing cap 29 from gas port and engaging gas receptacle 16. This will help to limit the amount of air eventually stored in gas receptacle 16. Additionally, during cold-crashing, suck-back of air should be avoided because it can lead to oxidation and flavor defects in the finished fermented beverage. Preferably, then, the fermenter headspace and blowoff vessel 12 are purged of air prior to storing fermentation gases. This purging is accomplished by allowing fermentation gases to exit the fermenter, flow through blowoff vessel 12, and exit the blowoff vessel through airlock 18 prior to storing gases.

As fermentation begins, gas port 28 may be capped by gas port cap 29, and gas receptacle 16 may not yet be installed. Since access cover 24 is substantially fixed in place, the volume of blowoff vessel 12 is substantially fixed so that the amount of gases that flows into blowoff vessel 12 may displace about the same amount of air and gases within blowoff vessel 12. Over time, air may be purged by the fermentation gases flowing through the blowoff vessel. As an example, the brewer may decide to let gases evacuate air within the system for the first 36 hours after pitching yeast. The appropriate flushing time depends on the rate of fermentation during flushing, the volume of fermentation gases expected to be produced over time, and the volume of gases to be stored.

To facilitate the purging of air, containment vessel vent 72 may be located on the opposite side of containment vessel 22 from blowoff port 26, and the flow of gases through the blowoff port is directed down into the containment vessel 22 while the containment vessel vent draws 72 gases from the top of the containment vessel 22, as shown in FIG. 2. Incoming fermentation gases may flow down toward the bottom of containment vessel 22 on one side of the vessel while a gas-air mixture may be pushed out of the top of the vessel 22 through vent 72 on a side opposing the position of the blowoff port 26. Also, skirt notches 46 may be located on nearly the opposite side of inner channel 36 from containment vessel vent 72. This configuration may promote the flow of gases through most of the length of inner channel 36, reducing stagnant areas. As a result of this configuration, air in containment vessel 22 and inner channel 36 may be effectively flushed out by fermentation gases entering the assembly 74 from the fermenter 100 through the blowoff port 26.

Gases that flow through skirt notches 46 and bubble up through the airlock liquid in outer channel 38. The gases then flow through outer channel 38, above the liquid level, to vent ports 39, and pass through the vent ports 39 to the ambient atmosphere. The bubbling gases may result in foaming in outer channel 38. In examples consistent with FIGS. 1-3, vent ports 39 may be disposed on access cover 24 over a side of outer channel 38 that opposes the side of outer channel 38 where skirt notches 46 are disposed. This provides travel time and distance for foam dissipation as the gases flow toward the vent ports. Vent ports 39 may be small apertures which, due to their size and/or multiplicity, may burst the foam bubbles as the gases pass through the vent ports 39. This may allow the gases to escape while most of the airlock liquid drains back into channel 32 due to reduced pressure from releasing a gas bubble.

After optionally purging air from the airlock/blowoff vessel assembly 74, the brewer may install gas receptacle 16 to store fermentation gases. In examples consistent with FIGS. 1-3, a brewer may first install sanitized gas tube seal 58 into the aperture of receptacle port flange 52 of gas receptacle 16. It may be desirable to maintain deflation of gas receptacle 16 during insertion. A brewer may insert sanitized gas tube 14 partway into the gas receptacle 16 through the aperture of gas tube seal 58. The diameter of gas tube 14 may be smaller than the inside diameter of gas tube seal 58, so the gas tube 14 slides freely into gas receptacle 16.

The brewer removes gas port cap 29 from gas port 28. The brewer inserts the available end of gas tube 14 into the gas port 28 while the other end of the gas tube 14 is still within deflated gas receptacle 16. Gas port seal 58 is then sealed to gas port 28 by sliding the gas port seal 58 (still installed in receptacle port flange 52) down over tapered gas port 28 until a substantially gas tight fit is achieved. As shown in FIG. 3, gases can now flow from blowoff vessel 12 into gas tube 14, and receptacle port flange 52 is sealed to gas port 28 by gas tube seal 58. Receptacle seal 56 provides a gas tight seal of receptacle port flange 52 about receptacle port 50 of gas receptacle 16, so the gas receptacle can inflate and hold pressure. Examples of gas receptacle 16 may supported generally vertically by gas tube 14.

As active fermentation continues, gases flow into gas receptacle 16, causing it to inflate and providing gas storage. After gas receptacle 16 becomes full, gas pressure increases within the gas receptacle and blowoff vessel 12 until a flow of gases is released to the ambient atmosphere through airlock 18.

As an alternative, the brewer may flush air from the airlock/blowoff vessel assembly by connecting compressed carbon dioxide (CO2) to gas port 28 and flowing the gas through the blowoff vessel and airlock for a period of time prior to installing gas receptacle 16. Also, if the brewer prefers to store commercial CO2 in gas receptacle 16 instead of fermentation gases, the gas receptacle 16 may be installed following active fermentation, and CO2 may be temporarily connected to blowoff port 26 to inflate the gas receptacle 16. After inflation, blowoff tube 20 may be reinstalled on the blowoff port 26 prior to suck-back or cold crashing. Alternatively, the brewer may choose not to flush air from assembly 74.

During active fermentation, the fermenter 100 may discharge blowoff that flows through blowoff tube 20 into blowoff vessel 12. Containment vessel 22 contains the blowoff liquid while allowing the gases to flow through airlock 18 and/or into gas receptacle 16.

As shown in FIG. 3, an exemplary containment vessel 22 may have larger horizontal cross-sectional area than the horizontal cross-sectional area of blowoff port 26. During blowoff, the increase in cross sectional area of containment vessel 22 compared to blowoff port 26 slows the flow of blowoff as it fills the containment vessel, providing an opportunity for separation of the gas and liquid portions. Further, the blowoff foam is discharged toward the bottom of containment vessel 22, and the height of the containment vessel 22 may provide time, opportunity, and liquid contact that promote foam dissipation. Still further, containment vessel vent 72 and gas port 28 are located away from blowoff port 26, as shown in FIG. 3, increasing the ability of blowoff vessel 12 to contain the blowoff liquid.

After blowoff ceases discharging from fermenter 100, the brewer can continue to store blowoff within blowoff vessel 12 for the entire duration of the fermentation and cold-crashing, because apparatus 10 is intended to be sanitized and air-locked prior to initiation of fermentation. Gas receptacle 16 continues to provide gas storage during this time. Preferably, the gas receptacle will remain inflated under atmospheric pressure to allow the brewer to temporarily open the fermenter 100 as needed without losing stored gases. For example, the brewer may want to open the fermenter to add post-fermentation hops or to take specific gravity measurements to confirm that fermentation is completed. Additionally, the brewer may wish to rack the fermenting liquid to another container. In such a manner, the blowoff tube 20 simply may be placed in fluid communication with the new fermentation chamber after racking.

After fermentation, the fermenting liquid, such as beer, may be cold-crashed to clear it prior to packaging. During cold-crashing, or otherwise during suck-back, the decrease in temperature causes a decrease in pressure within the fermenter and apparatus 10. This decrease in pressure causes gas receptacle 16 to deflate, decreasing the storage of gases and providing a flow of gases from gas receptacle 16 to blowoff vessel 12, and from the blowoff vessel to the fermenter. In examples including a longitudinal groove within the lumen of gas port 28, and/or a plurality of gas tube orifices 54 in gas tube 14, alternate flow paths for gases to flow from gas receptacle 16 into gas tube 14 exist if one of gas tube orifices 54—or gas tube 14 itself—becomes plugged with gas receptacle material during deflation.

In examples, and depending on the volume of gas receptacle 16, gas receptacle 16 may not become completely deflated before the end of the cold-crash period. However, if gas receptacle 16 does become completely deflated and suck-back continues, the gas pressure within blowoff vessel 12 will decrease until a flow of air enters airlock 18 at skirt notches 46. Although suck-back of air is not ideal, the ability of apparatus 10 to admit air under sufficient vacuum prevents excessive vacuums that may damage the fermenter 100 or apparatus 10.

If suck-back of air does occur, the circuitous path of air from the ambient atmosphere, through vent ports 39, through outer channel 38 to skirt notches 46, through inner channel 36 to containment vessel vent 72, and through containment vessel 22 to blowoff port 26 and blowoff tube 20, helps increase the percentage of fermentation gases and reduce the percentage of air that enters the ferment 100, compared to a completely mixed volume of gases within blowoff vessel 12. In this way, blowoff vessel 12 and airlock 18 provide gas storage as well as blowoff containment. In addition, some fermentation gases are stored in solution within the airlock liquid and released into inner channel 36 when the system is under vacuum. This provides additional gas storage volume. Gas storage within the airlock liquid is improved by limiting the airlock liquid's exposure to ambient air using an access cover that extends over outer channel 38. Additionally, any volume of ambient air returned to the fermenter will be substantially less than the volume to which the fermenting liquid would be exposed using known systems, such as a conventional air lock positioned on the fermenter 100.

After cold-crashing, the brewer transfers the fermented liquid from the fermenter 100 for packaging. Apparatus 10 may remain connected during this transfer, continuing to supply stored gases to the fermenter 100 to replace the volume of fermented liquid drained or siphoned from the fermenter and controlling oxidation.

Additionally, consistent with the examples at FIGS. 1-3, the stored blowoff may allow a brewer to collect and store yeast from the finished batch of fermented liquid.

Although the disclosure has been described in detail for the purpose of illustration based on what is currently considered to be the most practical and/or preferred examples, it is to be understood that such detail is solely for that purpose and that the invention is not limited to the disclosed examples or embodiments, but, on the contrary, is intended to cover modifications and equivalent arrangements that are within the spirit and scope of the appended claims. For example, it is to be understood that the present invention contemplates that, to the extent possible, one or more features of any aspect or example can be combined with one or more features of any other aspect or example.

What is claimed is:

1. An apparatus for capturing blowoff and fermentation gasses from a fermenter for food or beverages, comprising:
   a blowoff vessel configured to capture blowoff from the fermenter and positioned externally to the fermenter, the blowoff vessel comprising a first port configured to establish fluid communication between the blowoff vessel and the fermenter;
   an airlock in fluid communication between the blowoff vessel and ambient atmosphere; and
   a gas receptacle in fluid communication with the blowoff vessel, the gas receptacle configured to receive and store fermentation gases from the fermenter during fermentation, to allow stored fermentation gases to return to the fermenter during suck-back, and to prevent venting of fermentation gases to ambient atmosphere through the gas receptacle; and wherein the gas receptacle is inflatable.

2. The apparatus according to claim 1, wherein the airlock is liquid-filled.

3. The apparatus according to claim 2, further comprising an access cover removably covering at least a portion of the blowoff vessel.

4. The apparatus according to claim 2, further comprising:
a second port establishing fluid communication between the blowoff vessel and the gas receptacle; and
a gas tube in fluid communication with the blowoff vessel and the gas receptacle.

5. The apparatus according to claim 2, further comprising:
a second port; and
a gas tube comprising: a first end positioned proximally to the blowoff vessel, and a second end positioned distally from the blowoff vessel; and
wherein the gas receptacle comprises a receptacle port configured to sealably mate with the second port,
wherein at least a first portion of the first end of the gas tube extends coaxially into the second port, and the second end extends into the gas receptacle, and
wherein fluid communication is established between the blowoff vessel and the gas receptacle through at least one of the second port and the gas tube.

6. The apparatus according to claim 1, wherein the blowoff vessel further comprises a containment vessel, the containment vessel comprising an exterior surface and an interior; and
wherein the airlock comprises:
a channel in fluid communication with the interior of the containment vessel, the channel at least partially defined by a first portion of the exterior surface of the containment vessel, and
a skirt extending into the channel,
wherein the channel and the skirt coact to form the airlock when at least a portion of the skirt is covered by liquid in the channel.

7. The apparatus according to claim 6, further comprising:
an airlock vessel comprising an outer surface and an inner surface, the airlock vessel configured to receive the containment vessel,
wherein the channel is at least partially defined by a first portion of the inner surface of the airlock vessel.

8. The apparatus according to claim 6, further comprising an access cover removably covering at least a portion of the containment vessel and the channel, wherein the skirt is formed on the access cover, and extends from the access cover into the channel.

9. The apparatus according to claim 1, wherein the blowoff vessel further comprises:
a containment vessel comprising an exterior surface and an interior; and
an airlock vessel comprising an outer surface and an inner surface, the airlock vessel configured to receive the containment vessel
an access cover removably covering at least a portion of the blowoff vessel, the access cover comprising:
a second port establishing fluid communication between the blowoff vessel and the gas receptacle, and
a skirt extending into the airlock,
wherein the first port is positioned on the access cover;
a gas tube in fluid communication with the blowoff vessel and the gas receptacle; the gas tube comprising:
a first end positioned proximally to the blowoff vessel, and
a second end positioned distally from the blowoff vessel;
wherein the gas receptacle comprises a receptacle port configured to sealably mate with the second port to establish fluid communication between the blowoff vessel and the gas receptacle,
wherein at least a first portion of the first end of the gas tube extends coaxially into the second port, and the second end extends into the gas receptacle, and
wherein fluid communication is established between the blowoff vessel and the gas receptacle through at least one of the second port and the gas tube,
wherein the airlock comprises:
a channel in fluid communication with the interior of the containment vessel, the channel at least partially defined by a first portion of the exterior surface of the containment vessel and a first portion of the inner surface of the airlock vessel; and
wherein the channel and the skirt coact to form the airlock when at least a portion of the skirt is covered by liquid in the channel.

10. The apparatus according to claim 1, further comprising a blowoff fitting, the blowoff fitting comprising a first aperture, a second aperture, and a third aperture,
wherein the blowoff fitting establishes fluid communication between the fermenter and the first port through the first aperture and the second aperture, and
wherein the blowoff fitting establishes fluid communication between the fermenter and the gas receptacle through the first aperture and the third aperture.

11. The apparatus according to claim 1, further comprising a baffle configured to increase fluid flow path distance for at least a portion of flow between the first port and the airlock.

* * * * *